US012086925B2

(12) United States Patent
Lombardi et al.

(10) Patent No.: US 12,086,925 B2
(45) Date of Patent: Sep. 10, 2024

(54) TARGETLESS TRACKING OF MEASUREMENT DEVICE DURING CAPTURE OF SURROUNDING DATA

(71) Applicant: FARO Technologies, Inc., Lake Mary, FL (US)

(72) Inventors: Marco Lombardi, Brescia (IT); Francesco Bonarrigo, Ghedi (IT); Andrea Riccardi, Rezzato (IT); Federico Barone, Bagnolo Mella (IT)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 17/702,982

(22) Filed: Mar. 24, 2022

(65) Prior Publication Data

US 2022/0406005 A1    Dec. 22, 2022

Related U.S. Application Data

(60) Provisional application No. 63/211,767, filed on Jun. 17, 2021.

(51) Int. Cl.
| | | |
|---|---|---|
| *G06T 15/20* | (2011.01) | |
| *G06T 7/593* | (2017.01) | |
| *G06T 7/73* | (2017.01) | |
| *G06V 10/10* | (2022.01) | |

(52) U.S. Cl.
CPC ............ *G06T 15/205* (2013.01); *G06T 7/593* (2017.01); *G06T 7/73* (2017.01); *G06V 10/17* (2022.01); *G06T 2207/10012* (2013.01); *G06T 2207/10028* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 8,705,012 B2 | 4/2014 | Greiner et al. | |
| 10,824,773 B2 | 11/2020 | Santos et al. | |
| 10,989,532 B2 | 4/2021 | Buback et al. | |
| 2008/0144925 A1* | 6/2008 | Zhu ........................ | G06V 10/24 382/154 |
| 2009/0220157 A1* | 9/2009 | Kato .................... | G06V 40/171 382/201 |
| 2012/0069352 A1 | 3/2012 | Ossig et al. | |
| 2015/0095360 A1* | 4/2015 | Vrcelj ............... | G06F 18/24143 707/758 |
| 2017/0277197 A1* | 9/2017 | Liao ......................... | G06T 7/20 |

(Continued)

OTHER PUBLICATIONS

Alatise et al., "Pose Estimation of a Mobile Robot Based on Fusion of IMU Data and Vision Data Using an Extended Kalman Filter," Sensors 2017, 17, 2164, doi:10.3390/s17102164, pp. 1-22.

(Continued)

*Primary Examiner* — Anh-Tuan V Nguyen
(74) *Attorney, Agent, or Firm* — McCarter & English, LLP; Dave S. Christensen

(57) ABSTRACT

Technical solutions are described to track a handheld three-dimensional (3D) scanner in an environment using natural features in the environment. In one or more examples, the natural features are detected using machine learning. Features are filtered by performing a stereo matching between respective pairs of stereo images captured by the scanner. The features are further filtered using time matching between images captured by the scanner at different time-points.

20 Claims, 23 Drawing Sheets

(56) References Cited

U.S. PATENT DOCUMENTS

| | | | |
|---|---|---|---|
| 2018/0232906 A1* | 8/2018 | Kim | G06T 7/246 |
| 2018/0268256 A1* | 9/2018 | Di Febbo | G06V 10/757 |
| 2019/0145775 A1* | 5/2019 | Cui | G06T 7/246 |
| | | | 701/446 |
| 2020/0364901 A1* | 11/2020 | Choudhuri | G06T 19/006 |
| 2021/0182626 A1* | 6/2021 | Revaud | G06V 10/764 |
| 2021/0241022 A1* | 8/2021 | Lee | G06N 3/08 |
| 2021/0287274 A1* | 9/2021 | Nguyen | G06N 3/04 |
| 2022/0028093 A1* | 1/2022 | Sinha | G06T 7/337 |
| 2022/0172386 A1* | 6/2022 | Liu | G06T 7/73 |
| 2023/0045796 A1* | 2/2023 | He | B25J 9/163 |

OTHER PUBLICATIONS

Duan et al., "Deep Learning for Visual SLAM in Transportation Robotics: A review," Transportation Safety and Environment, 2019, vol. 1, No. 3, pp. 177-184.

Li et al., "DXSLAM: A Robust and Efficient Visual SLAM System with Deep Features," arXiv:2008.05416v1 [cs.CV], Aug. 12, 2020, 8 pages.

Li et al. "A deep-learning real-time visual SLAM system based on multi-task featureextraction network and self-supervised feature points," Elsevier, Measurement 168 (2021) 108403, Sep. 6, 2020, pp. 1-10.

Li et al., "UnDeepVO: Monocular Visual Odometry through Unsupervised Deep Learning," 2018 IEEE International Conference on Robotics and Automation (ICRA), 2018, pp. 7286-7291.

Mourikis et al., "A Multi-State Constraint Kalman Filter for Vision-aided Inertial Navigation," Proceedings 2007 IEEE International Conference on Robotics and Automation, 2007, 8 pages.

Wang et al., "DeepVO: Towards end-to-end visual odometry with deep Recurrent Convolutional Neural Networks," 2017 IEEE International Conference on Robotics and Automation (ICRA), 2017, 8 pages.

* cited by examiner

TARGETLESS TRACKING OF MEASUREMENT DEVICE DURING CAPTURE OF SURROUNDING DATA

CROSS REFERENCE TO RELATED APPLICATIONS

This application claims the benefit of U.S. Provisional Application Ser. No. 63/211,767, filed Jun. 17, 2021, the entire disclosure of which is incorporated herein by reference.

BACKGROUND

The present application is directed to a portable system that optically scans an environment, such as a building, and in particular to a handheld three-dimensional (3D) scanning system that generates two-dimensional (2D) and three-dimensional (3D) scans of the environment.

A portable scanner includes a projector that projects light patterns on the surface of an object to be scanned. The position of the projector is determined by means of a projected, encoded pattern. Two (or more) cameras, the relative positions and alignment of which are known or are determined, can record images of the surface with a further, uncoded pattern. The three-dimensional coordinates (of the points of the pattern) can be determined by means of mathematical methods which are known per se, such as epipolar geometry.

In video gaming applications, scanners are known as tracking devices, in which a projector projects an encoded light pattern onto the target to be pursued, preferably the user who is playing, in order to then record this encoded light pattern with a camera and to determine the coordinates of the user. The data are represented on an appropriate display.

A system for scanning a scene, including distance measuring, may include, in its most simplest form, a camera unit with a single camera, and illumination unit and a synchronizing unit. The camera, which may optionally include filters, is used for the registration of a target area. The illumination unit is used for generating a pattern in the target area, such as by means of a diffractive optical element. The synchronizing unit synchronizes the illumination unit and the camera unit. Camera unit and illumination unit can be set up in selectable relative positions. Optionally, also two camera units or two illumination units can be used.

In some systems, during the scanning process, the scanner acquires, at different times, a series of images of the patterns of light formed on the object surface. These multiple images are then registered relative to each other so that the position and orientation of each image relative to the other images are known. Particularly with handheld scanners, various techniques have been used to register the images. One common technique uses features in the images to match overlapping areas of adjacent image frames. This technique works well when the object being measured has many features relative to the field of view of the scanner. However, if the object contains a relatively large flat or curved surface, the images may not properly register relative to each other.

A 3D image of a scene may require multiple scans from different registration positions. The overlapping scans are registered in a joint coordinate system, for example, as described in U.S. Published Patent Application No. 2012/0069352 ('352), the contents of which are incorporated herein by reference. Such registration is performed by matching targets in overlapping regions of the multiple scans. The targets may be artificial targets such as spheres or checkerboards or they may be natural features such as corners, textures, or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station.

However, even with these improvements, it is today difficult to remove the need for a user to carry out the manual registration steps as described above. In a typical case, only 30% of 3D scans can be automatically registered to scans taken from other registration positions. Such registration is seldom carried out at the site of the 3D measurement but instead in a remote location following the scanning procedure. In a typical case, a project requiring a week of scanning requires two to five days to manually register the multiple scans. This adds to the cost of the scanning project. Furthermore, the manual registration process sometimes reveals that the overlap between adjacent scans was insufficient to provide proper registration. In other cases, the manual registration process may reveal that certain sections of the scanning environment have been omitted. When such problems occur, the operator must return to the site to obtain additional scans. In some cases, it is not possible to return to a site. It should be noted that with the use of artificial targets and experienced operator, the manual registration can be minimized. However, challenges still exist such as, a building that was available for scanning at one time may be impossible to access at a later time for example. Further, a forensics scene of an automobile accident or a homicide is often not available for taking of scans for more than a short time after the incident.

It should be appreciated that where an object (e.g. a wall, a column, or a desk) blocks the beam of light, that object will be measured but any objects or surfaces on the opposite side will not be scanned since they are in the shadow of the object relative to the scanner. Therefore, to obtain a more complete scan of the environment, the scanner is moved to different locations and separate scans are performed. Subsequent to the performing of the scans, the 3D coordinate data (i.e. the point cloud) from each of the individual scans are registered to each other and combined to form a 3D image or model of the environment.

Some existing measurement systems have been mounted to a movable structure, such as a cart, and moved on a continuous basis through the building to generate a digital representation of the building. However, these provide generally lower data quality than stationary scans. These systems tend to be more complex and require specialized personnel to perform the scan. Further, the scanning equipment including the movable structure may be bulky, which could further delay the scanning process in time sensitive situations, such as a crime or accident scene investigation.

Accordingly, while existing scanners are suitable for their intended purposes, what is needed is a scanner having certain features of examples.

BRIEF DESCRIPTION

According to one or more embodiments, a system includes a scanner device to capture a stereo image at each timepoint from a plurality of timepoints, wherein the scanner device is moved between two successive timepoints, the stereo image comprises a first image and a second image. The system also includes one or more processors in communication with the scanner device, wherein the one or more processors identify, at each timepoint T, using the stereo image captured at said timepoint T, one or more natural features. Identifying the one or more natural features includes, determining, using a machine learning algorithm, a first set of keypoints and corresponding descriptors from the first image. Further, using the machine learning algorithm, a second set of keypoints and corresponding descriptors are determined from the second image. Further, from the first image and from the second image, one or more matching keypoints are identified by comparing the first set of keypoints and corresponding descriptors and the second set of keypoints and corresponding descriptors. Further, the one or more matching keypoints are recorded as the one or more natural features at the timepoint T. Further, at a periodic timepoint Tx, a pose of the scanner device is determined by performing a time-matching between the one or more natural features at the timepoint Tx and the one or more natural features at the timepoint Tx-p, where $p>=1$. The time-matching includes identifying a set of natural features that are present in both the one or more natural features at the timepoint Tx and the one or more natural features at the timepoint Tx-p. The time-matching further includes computing a rigid transform estimation between the set of natural features at the timepoint Tx and at the timepoint Tx-p. The time-matching further includes determining the pose of the scanner device by updating an earlier pose from the timepoint Tx-p by the rigid transform estimation.

In one or more examples, the rigid transform estimation is computed using 3D coordinates corresponding to the set of natural features that have been captured.

In one or more examples, the 3D coordinates are determined by identifying, in a point cloud captured by the scanner device, a point corresponding to each respective natural feature from the set of natural features.

In one or more examples, identifying the set of natural features that are present in both the one or more natural features at the timepoint Tx and the one or more natural features at the timepoint Tx-p includes determining a search window in the stereo image of the timepoint Tx based on an output from an inertial measurement unit coupled with the scanner device, or based on interpolation of an inferred trajectory of the scanner device, wherein the search window comprises a subset of natural features from the stereo image of the timepoint Tx. Further, the set of natural features is limited to match in order that are selected to compute the rigid transform estimate to the search window.

In one or more examples, the output of the inertial measurement unit is used to estimate the pose of the scanner device at timepoints between Tx-p and Tx.

In one or more examples, the scanner device is handheld.

In one or more examples, the scanner is equipped on a movable platform.

According to one or more embodiments, a method for performing a simultaneous location and mapping of a scanner device in a surrounding environment includes capturing, by a scanner device, a stereo image at each timepoint from a plurality of timepoints, wherein the scanner device is moved between two successive timepoints, the stereo image comprises a first image and a second image. The method further includes performing a simultaneous location and mapping by one or more processors in communication with the scanner device. Performing simultaneous location and mapping includes identifying, at each timepoint T, using the stereo image captured at said timepoint T, one or more natural features. Identifying the one or more natural features includes determining, using a machine learning algorithm, a first set of keypoints and corresponding descriptors from the first image. Identifying the one or more natural features further includes determining, using the machine learning algorithm, a second set of keypoints and corresponding descriptors from the second image. Identifying the one or more natural features further includes identifying, one or more matching keypoints by comparing the first set of keypoints and corresponding descriptors and the second set of keypoints and corresponding descriptors. Identifying the one or more natural features further includes recording the one or more matching keypoints as the one or more natural features at the timepoint T. The method further includes determining, at a periodic timepoint Tx, a pose of the scanner device by performing a time-matching between the one or more natural features at the timepoint Tx and the one or more natural features at the timepoint Tx-p, $p>=1$. The time-matching includes identifying a set of natural features that are present in both the one or more natural features at the timepoint Tx and the one or more natural features at the timepoint Tx-p. The time-matching further includes computing a rigid transform estimation between the set of natural features at the timepoint Tx and at the timepoint Tx-p. The time-matching further includes determining the pose of the scanner device by updating an earlier pose from the timepoint Tx-p by the rigid transform estimation.

According to one or more embodiments, a non-transitory computer-readable medium having program instructions embodied therewith, the program instructions readable by a processor to cause the processor to perform a method performing a simultaneous location and mapping of a scanner device in a surrounding environment. The method includes capturing, by a scanner device, a stereo image at each timepoint from a plurality of timepoints, wherein the scanner device is moved between two successive timepoints, the stereo image comprises a first image and a second image. The method further includes performing a simultaneous location and mapping by one or more processors in communication with the scanner device. Performing simultaneous location and mapping includes identifying, at each timepoint T, using the stereo image captured at said timepoint T, one or more natural features. Identifying the one or more natural features includes determining, using a machine learning algorithm, a first set of keypoints and corresponding descriptors from the first image. Identifying the one or more natural features further includes determining, using the machine learning algorithm, a second set of keypoints and corresponding descriptors from the second image. Identifying the one or more natural features further includes identifying, one or more matching keypoints by comparing the first set of keypoints and corresponding descriptors and the second set of keypoints and corresponding descriptors. Identifying the one or more natural features further includes recording the one or more matching keypoints as the one or more natural features at the timepoint T. The method further includes determining, at a periodic timepoint Tx, a pose of the scanner device by performing a time-matching between the one or more natural features at the timepoint Tx and the one or more natural features at the timepoint Tx-p, $p>=1$. The time-matching includes identifying a set of natural features that are present in both the one or more natural features at the timepoint Tx and the one or more natural features at the timepoint Tx-p. The time-matching further includes computing a rigid transform estimation between the set of natural features at the timepoint Tx and at the timepoint Tx-p. The time-matching further includes determining the pose of the scanner device by updating an earlier pose from the timepoint Tx−p by the rigid transform estimation.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example, with reference to the drawings.

DETAILED DESCRIPTION

Examples provide technical solutions to technical challenges in existing measurement devices, such as scanning systems used to scan an environment. The environment can be an interior, an exterior, or a combination thereof, of a building. For example, the environment can be a construction site, an office space, a home, a shopping space, an accident site, a forensic site, an industrial space, a hospital, a laboratory, a historical monument, a park, or any other physical environment that is to be measured. It should be noted that various other examples of objects, e.g., industrial robots, manufactured products, appliances, also can be scanned using measured devices described herein. Further, it should be noted that the above lists are not exhaustive and the technical solutions described herein can facilitate the use of measurement devices in several other scenarios. The scanning system can capture two-dimensional (2D) or three-dimensional (3D) scans. Such scans can include 2D maps, 3D point clouds, or a combination thereof. The scans can include additional components, such as annotations, images, textures, measurements, and other details.

Examples facilitate a mobile scanning platform that allows for simultaneous scanning, mapping, and trajectory generation of an environment while the scanning system is moving in the same environment. Examples provide a handheld scanner that is sized and weighted to be carried by a single person. Examples provide for a mobile scanning platform that may be used to scan an environment in an autonomous or semi-autonomous manner, where the scanning platform facilitates autonomous or semi-autonmous movement of the scanning system through the environment.

Typically, when capturing a scan of an environment, a version of the simultaneous localization and mapping (SLAM) algorithm is used. For completing such scans a scanner, such as the FARO® SCANPLAN®, FARO® SWIFT®, FARO® FREESTYLE®, or any other scanning system incrementally builds the scan of the environment, while the scanner is moving through the environment, and simultaneously the scanner tries to localize itself on this scan that is being generated. An example of a handheld scanner is described in U.S. patent application Ser. No. 15/713,931, the contents of which is incorporated by reference herein in its entirety. This type of scanner may also be combined with another scanner, such as a time of flight scanner (TOF) as is described in commonly owned U.S. patent application Ser. No. 16/567,575, the contents of which are incorporated by reference herein in its entirety. It should be noted that the scanners listed above are just examples and that the type of scanner used in one or more embodiments does not limit the features of the technical solutions described herein.

Figure 1:
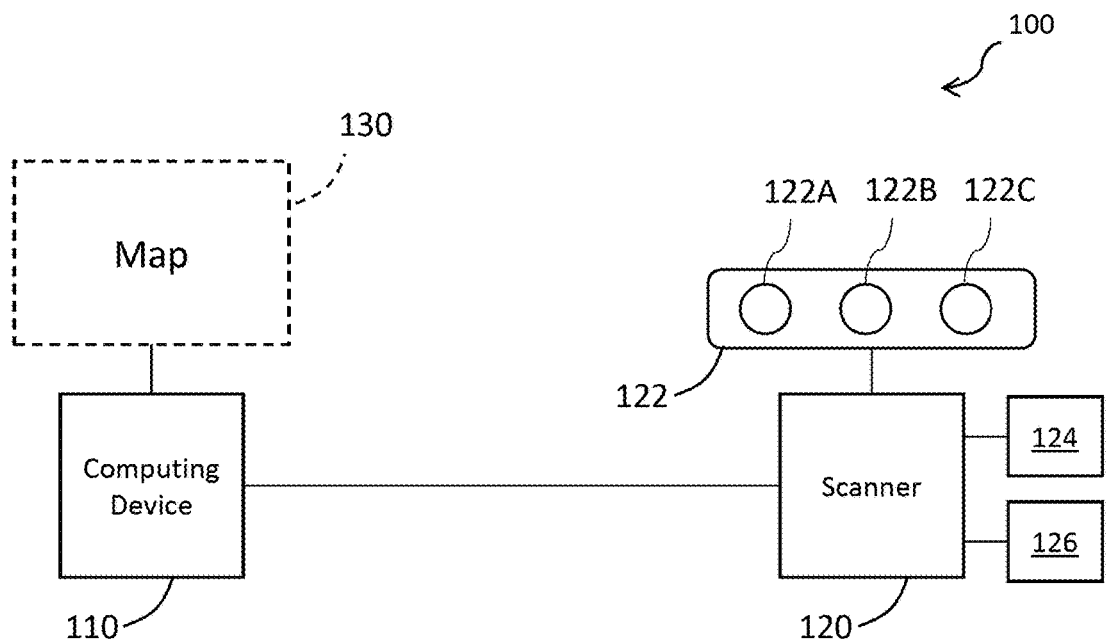
FIG. 1 depicts a system for scanning an environment according to one or more examples.

FIG. 1 depicts a system for scanning an environment according to one or more examples. The system 100 includes a computing system 110 coupled with a scanner device 120. The coupling facilitates wired and/or wireless communication between the computing system 110 and the scanner device 120. The scanner device 120 can be a 2D scanner, a 3D scanner, or a combination of both. The scanner device 120 captures measurements of the surroundings of the scanner device 120, i.e., the environment. The measurements are transmitted to the computing system 110 to generate a map 130 of the environment in which the scanner is being moved. The map 130 can be generated by combining several submaps. Each submap is generated using SLAM.

Figure 2:
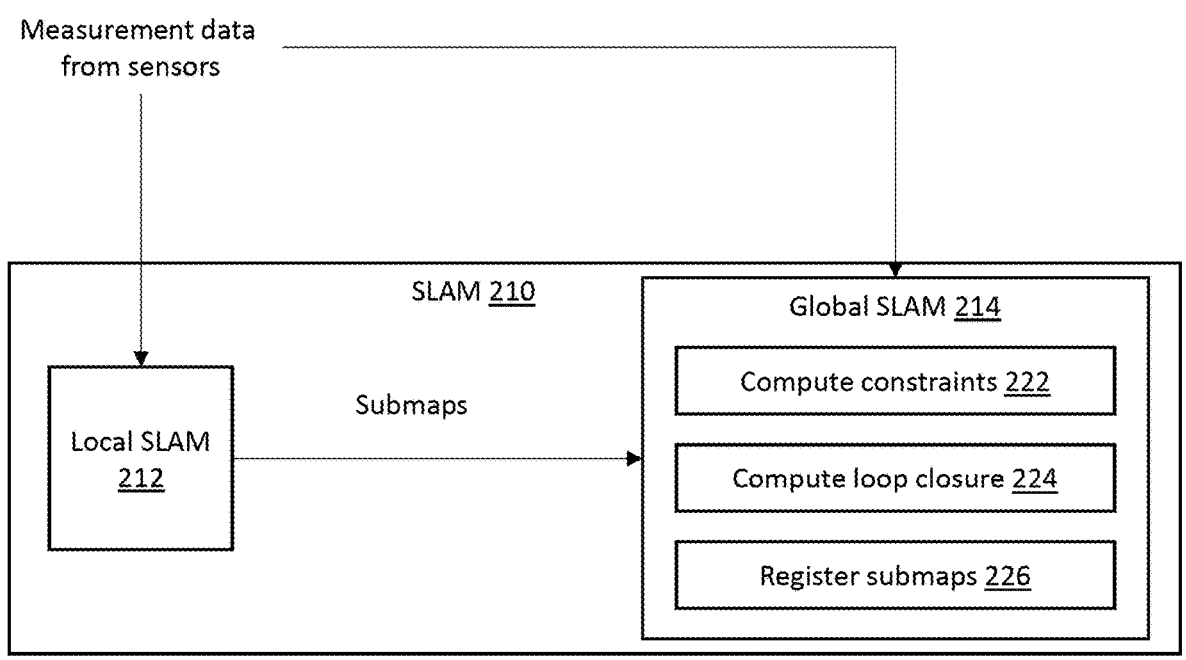
FIG. 2 depicts a flowchart of a method for using sensor data for simultaneously locating and mapping a scanner in an environment according to one or more examples.

FIG. 2 depicts a high level operational flow for implementing SLAM according to one or more examples. Implementing SLAM 210 includes generating one or more submaps corresponding to one or more portions of the environment. The submaps are generated using the one or more sets of measurements from the sets of sensors 122. Generating the submaps may be referred to as "local SLAM" (212). The submaps are further combined by the SLAM algorithm to generate the map 130. Combining the submaps process may be referred to as "global SLAM" (214). Together, generating the submaps and the final map of the environment is referred to herein as implementing SLAM, unless specifically indicated otherwise.

It should be noted that the operations shown in FIG. 2 are at high level, and that typical implementations of SLAM 210 can include operations such as filtering, sampling, and others, which are not depicted.

The local SLAM 212 facilitates inserting a new set of measurement data captured by the scanner device 120 into a submap construction. This operation is sometimes referred to as "scan matching." A set of measurements can include one or more point clouds, distance of each point in the point cloud(s) from the scanner device 120, color information at each point, radiance information at each point, and other such sensor data captured by a set of sensors 122 that is equipped on the scanner device 120. For example, the sensors 122 can include a LIDAR 122A, a depth camera 122B, a camera 122C, etc. The scanner device 120 can also include an inertial measurement unit (IMU) 126 to keep track of a 3D orientation of the scanner device 120. In an example, the scanner device 120 is a handheld portable laser line scanner that projects a laser line onto the surface of the object and the 3D coordinates are determined via epipolar geometry.

The captured measurement data is inserted into the submap using an estimated pose of the scanner device 120. The pose can be extrapolated by using the sensor data from sensors such as IMU 126, (sensors besides the range finders) to predict where the scanned measurement data is to be inserted into the submap. Various techniques are available for scan matching. For example, a point to insert the measured data can be determined by interpolating the submap and sub-pixel aligning the scan. Alternatively, the measured data is matched against the submap to determine the point of insertion. A submap is considered as complete when the local SLAM 212 has received at least a predetermined amount of measurement data. Local SLAM 212 drifts over time, and global SLAM 214 is used to fix this drift.

It should be noted that a submap is a representation of a portion of the environment and that the map 130 of the environment includes several such submaps "stitched" together. Stitching the maps together includes determining one or more landmarks on each submap that is captured, aligning, and registering the submaps with each other to generate the map 130. Further, generating each submap includes combining or stitching one or more sets of measurements. Combining two sets of measurements requires matching, or registering one or more landmarks in the sets of measurements being combined.

Accordingly, generating each submap and further combining the submaps includes registering a set of measurements with another set of measurements during the local SLAM (212), and further, generating the map 130 includes registering a submap with another submap during the global SLAM (214). In both cases, the registration is done using one or more landmarks.

Here, a "landmark" is a feature that can be detected in the captured measurements and be used to register a point from the first set of measurements with a point from the second set of measurements. For example, the landmark can facilitate registering a 3D point cloud with another 3D point cloud or to register an image with another image. Here, the registration can be done by detecting the same landmark in the two images (or point clouds) that are to be registered with each other. A landmark can include, but is not limited to features such as a doorknob, a door, a lamp, a fire extinguisher, or any other such identification mark that is not moved during the scanning of the environment. The landmarks can also include stairs, windows, decorative items (e.g., plant, picture-frame, etc.), furniture, texture of walls, objects, or other surface, or any other such structural or stationary objects. In addition to such "naturally" occurring features, i.e., features that are already present in the environment being scanned, landmarks can also include "artificial" landmarks that are added by the operator of the scanner device 120. Such artificial landmarks can include identification marks that can be reliably captured and used by the scanner device 120. Examples of artificial landmarks can include predetermined markers, such as labels of known dimensions and patterns, e.g., a checkerboard pattern, a target sign, or other such preconfigured markers (e.g. spherical markers).

The global SLAM (214) can be described as a pose graph optimization problem. As noted earlier, the SLAM algorithm is used to provide concurrent construction of a model of the environment (the scan), and an estimation of the state of the scanner device 120 moving within the environment. In other words, SLAM provides a way to track the location of a robot in the world in real-time and identify the locations of landmarks such as buildings, trees, rocks, walls, doors, windows, paintings, décor, furniture, and other world features. In addition to localization, SLAM also generates or builds up a model of the environment to locate objects including the landmarks that surround the scanner device 120 and so that the scan data can be used to ensure that the scanner device 120 is on the right path as the scanner device 120 moves through the world, i.e., environment. So, the technical challenge with the implementation of SLAM is that while building the scan, the scanner device 120 itself might lose track of where it is by virtue of its motion uncertainty because there is no presence of an existing map of the environment because the map is being generated simultaneously.

The basis for SLAM is to gather information from the set of sensors 120 and motions over time and then use information about measurements and motion to reconstruct a map of the environment. The SLAM algorithm defines the probabilities of the scanner device 120 being at a certain location in the environment, i.e., at certain coordinates, using a sequence of constraints. For example, consider that the scanner device 120 moves in some environment, the SLAM algorithm is input the initial location of the scanner device 120, say (0,0,0) initially, which is also called as initial constraints. The SLAM algorithm is then inputted several relative constraints that relate each pose of the scanner device 120 to a previous pose of the scanner device 120. Such constraints are also referred to as relative motion constraints.

The technical challenge of SLAM can also be described as follows. Consider that the scanner is moving in an unknown environment, along a trajectory described by the sequence of random variables $x_{1:T}=\{x_1, \ldots, x_T\}$. While moving, the scanner acquires a sequence of odometry measurements $u_{1:T}=\{u_1, \ldots, u_T\}$ and perceptions of the environment $z_{1:T}=\{z_1, \ldots, z_T\}$. The "perceptions" include the captured data and the mapped detected planes 410. Solving the full SLAM problem now includes estimating the posterior probability of the trajectory of the scanner device 120 $x_{1:T}$ and the map M of the environment given all the measurements plus an initial position $x_0$: $P(x_{1:T}, M|z_{1:T}, u_{1:T}, x_0)$. The initial position $x_0$ defines the position in the map and can be chosen arbitrarily. There are several known approaches to implement SLAM, for example, graph SLAM, multi-level relaxation SLAM, sparse matrix-based SLAM, hierarchical SLAM, etc. The technical solutions described herein are applicable regardless of which technique is used to implement SLAM.

Figure 3:
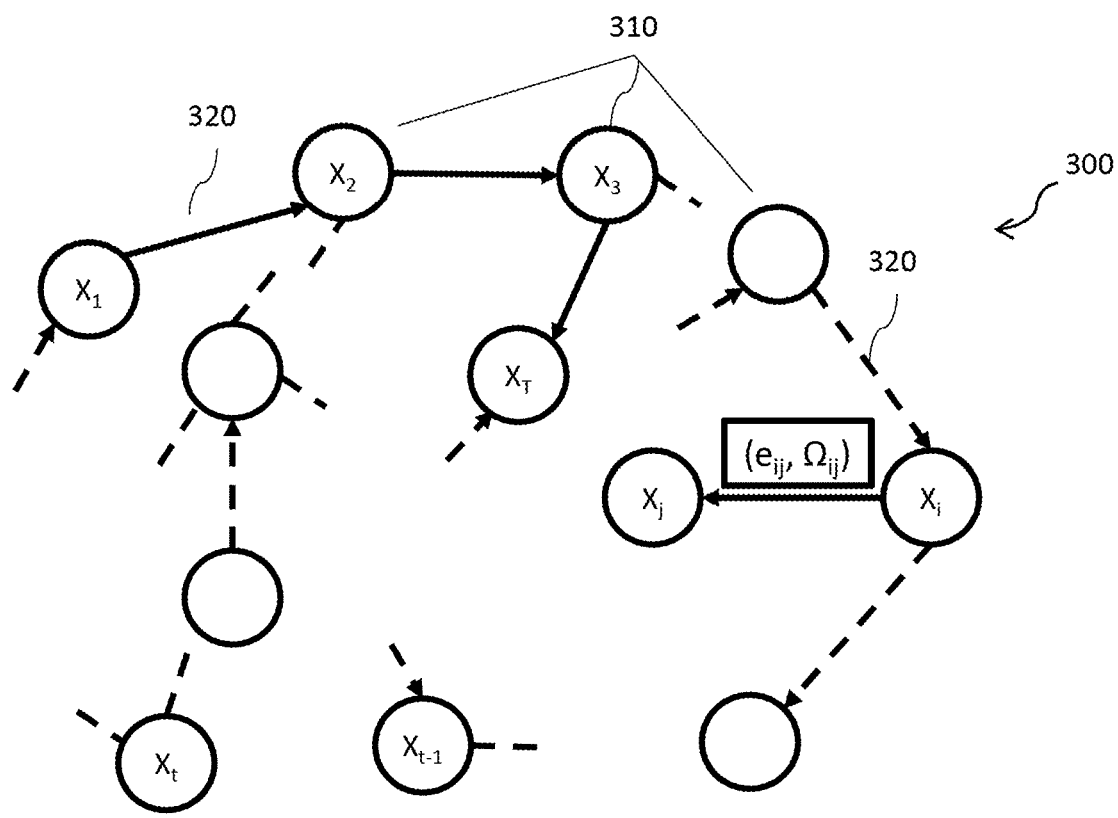
FIG. 3 depicts a graphical representation of an example SLAM implementation.

FIG. 3 depicts a graphical representation of an example SLAM implementation. In the depicted representation of the SLAM as a graph 300, every node 310 corresponds to a pose of the scanner device 120. Nearby poses are connected by edges 320 that model spatial constraints between poses of the scanner device 120 arising from measurements. Edges $e_{t-1,t}$ between consecutive poses model odometry measurements, while the other edges represent spatial constraints arising from multiple observations of the same part of the environment.

A graph-based SLAM approach constructs a simplified estimation problem by abstracting the raw sensor measurements. These raw measurements are replaced by the edges 320 in graph 300, which can then be seen as "virtual measurements." An edge 320 between two nodes 310 are labeled with a probability distribution over the relative locations of the two poses, conditioned to their mutual measurements. In general, the observation model $P(z_t|x_t, M_t)$ is multi-modal, and therefore the Gaussian assumption does not hold. This means that a single observation $z_t$ might result in multiple potential edges connecting different poses in the graph, and the graph connectivity needs itself to be described as a probability distribution. Directly dealing with this multi-modality in the estimation process would lead to a large combinatorial increase of complexity. As a result of that, most practical approaches restrict the estimate to the most likely topology. Hence, a constraint resulting from observation has to be determined.

If the observations are affected by (locally) Gaussian noise and the data association is known, the goal of a graph-based mapping algorithm is to compute a Gaussian approximation of the posterior over the trajectory of the scanner device 120. This involves computing the mean of this Gaussian as the configuration of the nodes 310 that maximizes the likelihood of the observations. Once the mean is known, the information matrix of the Gaussian can be obtained in a straightforward fashion, as is known in the art. In the following the task of finding is characterized with this maximum as a constraint optimization problem.

Let $x=(x_1, \ldots, x_T)^T$ be a vector of parameters, where $x_i$ describes the pose of node i. Let $z_{ij}$ and $\Omega_{ij}$ be respectively the mean and the information matrix of a virtual measurement between the node i and the node j. This virtual measurement is a transformation that makes the observations acquired from i maximally overlap with the observation acquired from j. Further, let $\hat{z}_{ij}(x_i, x_j)$ be the prediction of a virtual measurement given a configuration of the nodes $x_i$ and $x_j$. Usually, this prediction is the relative transformation between the two nodes. Let $e(x_i, x_j, z_{ij})$ be a function that computes a difference between the expected observation $\hat{z}_{ij}$ and the real observation $z_{ij}$ captured by the scanner device 120. For simplicity of notation, the indices of the measurement are encoded in the indices of the error function: $e_{ij}(x_i, x_j)=z_{ij}-\hat{z}_{ij}(x_i, x_j)$.

If C is the set of pairs of indices for which a constraint (observation) z exists, the goal of a maximum likelihood approach is to find the configuration of the nodes x* that minimizes the negative log-likelihood F(x) of all the observations: $F(x)=\Sigma_{(i,j)\in C} F_{ij}$, where $F_{ij}=e_{ij}^T\Omega_{ij}e_{ij}$. Accordingly, implementing SLAM includes solving the following equation and computing a Gaussian approximation of the posterior over the trajectory of the scanner device 120: $x^*=\text{argmin}_x F(x)$.

Several techniques are known for solving the above equations, for example, using Gauss-Newton or the Levenberg-Marquardt algorithms. The technical solutions provided by one or more examples can be used regardless of how the SLAM algorithm is implemented, i.e., regardless of how the above equations are solved.

Accordingly, implementing global SLAM 214 includes determining constraints (222) between nodes 320, i.e., submaps, objects, landmarks, or any other elements that are matched. Non-global constraints (also known as intra submaps constraints) are built automatically between nodes 310 that are closely following each other on a trajectory of the scanner device 120 in the environment. Global constraints (also referred to as loop closure constraints or inter submaps contraints) are constraints between a new submap and previous nodes 310 that are considered "close enough" in space and a strong fit, i.e., a good match when running scan matching. Here, "close enough" is based on predetermined thresholds, for example, distance between the same landmark from two submaps being within a predetermined threshold.

For example, existing implementations of SLAM use measurements, such as LIDAR data, from the set of sensors 122, to aggregate the measurements to generate the submaps and eventually the map 130. A technical challenge with such implementations is that the matching of the sets of measurements is inaccurate due to ambiguities or missing data. This may lead to misaligned sets of measurements and/or submaps, which in turn, cause an erroneous submap and/or map 130. Typically, "loop closure" 224 is used to prevent such errors by compensating for accumulated errors. However, loop closure cannot be used in the cases where the same landmarks are not identified in two sets of measurements or submaps that are being combined or stitched. One of the causes of such technical challenges is that the existing techniques can fail to identify matching features that can be used as reliable landmarks.

To address the technical challenges with the loop closure, such as mis-matching landmarks, and missing loop closure, because of unreliable landmarks, existing techniques estimate 2D correspondences across frames with different timestamps using artificial landmarks, sometimes referred to as "targets" or "markers." A challenge with such techniques is that one or more operators have to set up the environment by placing several such markers in the environment. The placement of the markers has to follow a certain procedure, and the scanning of the set up environment is constrained. Further, after the scanning is completed, the markers have to be removed. As can be noted, use of the markers is time consuming, and can be inefficient with larger environments, such as a shipping mall, a multi-storeyed building, a factory, a warehouse, etc. Further, in cases where multiple periodic scans of the environment are to be captured, for example, in the case of a construction site to determine progress, such set up and removal of markers can not only be inefficient, but also further challenging because of placement of the markers in substantially same spots.

In some embodiments, to overcome the challenges with the artificial landmarks, natural features are used as landmarks. Typically, such natural features are handcrafted, i.e., that are properly tailored for a specific job. For example, a corner with a 90-degree angle, walls with a particular length, pillars with a defined shape that can be defined using geometry primitives like a circle, doorknobs, etc. Thus, such natural features that are identified by the operator are "semantic features," which are detected in the captured measurement data by analyzing the captured data and identifying particular landmarks based on having a specific user-identifiable arrangement. However, such manual intervention, apart from the inherent inaccuracies, can also be inefficient. Further, a limitation with such techniques is when the environment includes certain circumstances, such as a long blank wall, glass panes, mirrors, etc., where a user-identifiable natural feature is difficult to discern. It is understood that above cases are exemplary and that such a limitation of not being able to detect a natural feature can occur in other cases as well.

Technical solutions described herein address such challenges further improve the process of identifying natural features in the environment by automatically selecting keypoints in the captured data as landmarks. The keypoints are detected using machine learning, for example, artificial neural networks, from each image captured by the scanner device 120. Further, the technical solutions described herein automatically extract a signature to describe the feature associated with each keypoint. Further yet, the technical solutions described herein facilitate to match the signatures and find the correspondences across images. The matching can be performed between two images in a stereo pair (same timepoint, different space), as well as across images that are captured at different timepoints. The technical solutions described herein subsequently estimate a rigid transform that moved a reference set of points from one image to their corresponding target set in another image.

Figure 4:
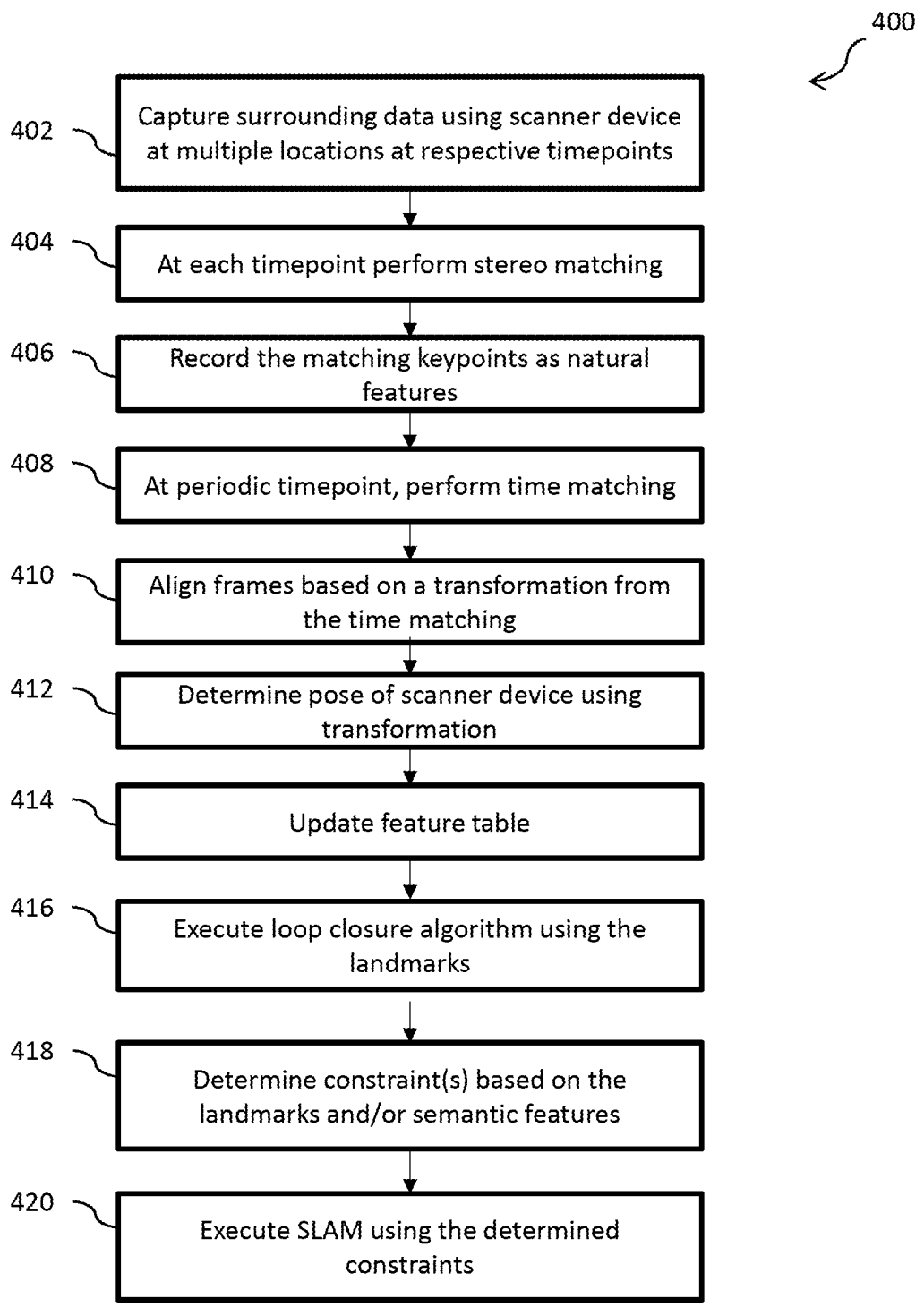
FIG. 4 depicts a flowchart of a method for targetless tracking of measurement device during capture of surrounding data according to one or more examples.

FIG. 4 depicts a flowchart of a method for targetless tracking of measurement device during capture of surrounding data according to one or more examples. The method facilitates the scanning system 100 to perform a simultaneous location and mapping with the data being captured by the scanner device 120 as it is being moved in the environment, which has not been mapped (or the map is unknown). The method 400 that is depicted includes, at block 402, capturing, by the scanner device 120, the surrounding data at different timepoints T0, T1 . . . Tx . . . Tn. At each timepoint Tx, the scanner device 120 is at a distinct pose in the environment. In other words, the scanner device 120 is moved from one location to another between timepoints Tx−1 and Tx. The movement can include translation, rotation, or any other type of movement along any axis of motion.

Figure 5:
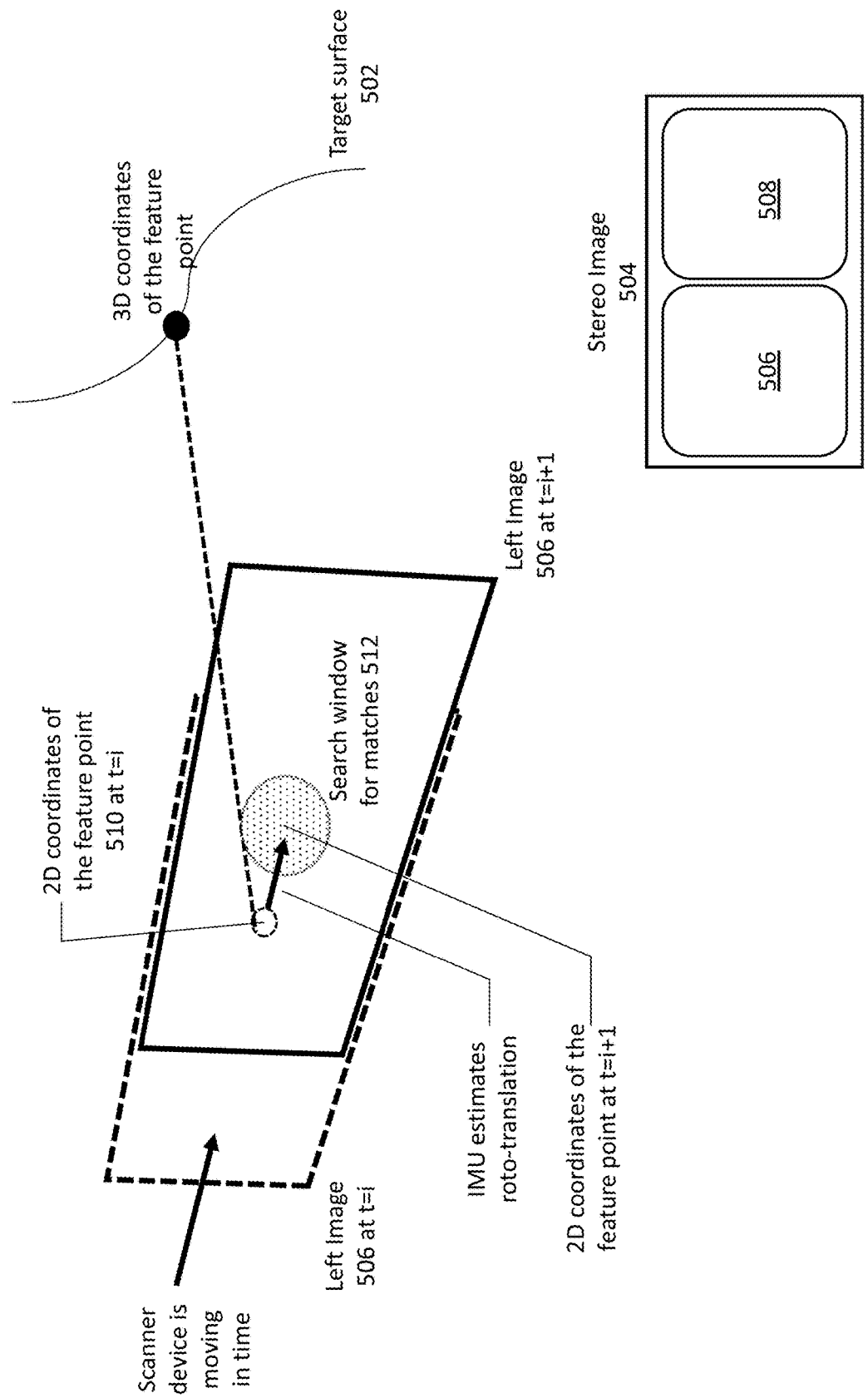
FIG. 5 depicts data captured by a scanner device at two different timepoints according to one or more examples.

FIG. 5 depicts data captured by the scanner device 120 at two different timepoints according to one or more examples. The captured data at a timepoint Ti and a timepoint Ti+1 is shown. Here, 'i' can take any value 1−(n−1) amount the n timepoints at which data is captured by the scanner device 120. The captured data at any timepoint may include a 3D point cloud representing a target surface 502 in the surrounding environment in a field of view of the scanner device 120. In some examples, the 3D point cloud is captured at a later time, during which the images are not captured. The pose of the 3D point cloud can be inferred, for example, using the IMU or by interpolation fitting of the trajectory. Additionally, the captured data at the timepoint Ti includes a stereo image 504 of the field of view. The stereo image 504 includes a pair of images, a first (e.g., left) image 506 and a second (e.g., right) image 508.

FIG. 5 depicts only left images 506 captured at time Ti and Ti+1, however, it should be understood that corresponding right images 508 are also captured. Further, while "left" and "right" images are referred herein, it is understood that in other examples, the left and right can be swapped, or alternatively, the stereo image 504 can include top and bottom images, or any other type of pair of images.

Referring again to the flowchart of FIG. 4, at each timepoint Ti, a stereo matching is performed on the captured data, at block 404. Stereo matching is performed to automatically detect, in the stereo image 504, keypoints that could be used as natural features during SLAM. The keypoints are automatically detected using machine learning, for example, artificial intelligence (AI) techniques, in one or more examples of the technical solutions described herein.

Figure 6:
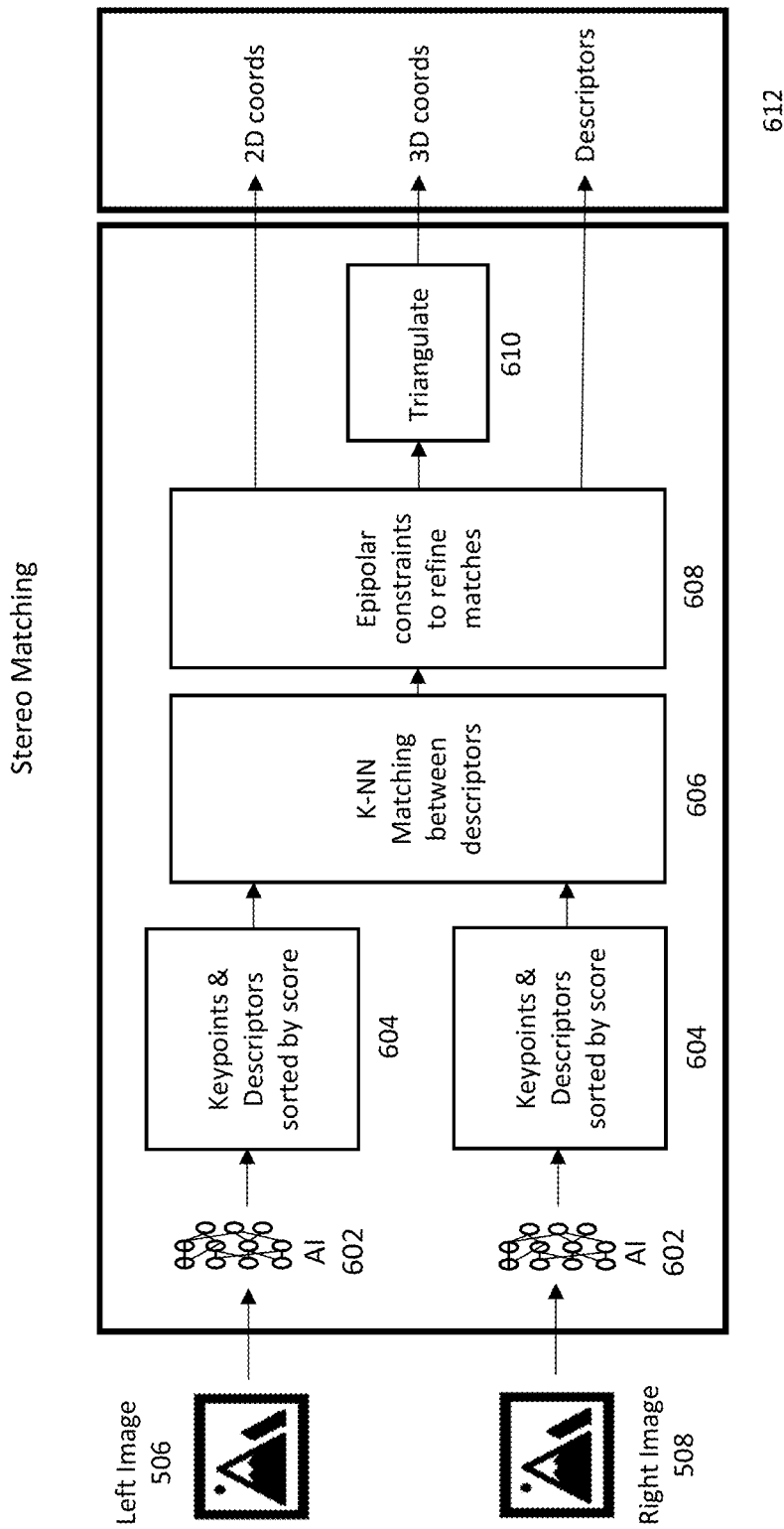
FIG. 6 depicts a block diagram depicting a stereo matching according to one or more examples.

FIG. 6 depicts a block diagram depicting a stereo matching according to one or more examples. The left image 506 and the right image 508 are used as input. An AI model 602 analyzes the input and identifies a set of keypoints and corresponding descriptors for the respective images 506, 508. In one or more examples, the AI model 602 detects the keypoints using convolutional neural networks (CNN), or any other types of artificial neural networks. In some examples, the neural network can be combined with a handcrafted detector for particular features in the images, like features from accelerated segment test (FAST), which is used to detect corners in the images. It is understood that FAST is just an example detector, and that other types of detectors can be used in other examples. Further, other examples leverage data driven only approaches to encourage the peakiness of saliency map.

Typically, existing deep feature matching methods facilitate learning the descriptors of detected features, both sparsely and densely, using metric learning loss such as the triplet loss and the contrastive loss in supervised fashion. Alternatively, AI models such as learned invariant feature transform (LIFT), and SuperPoint use a pipeline to jointly learn detectors and descriptors with supervised training. In other cases, the AI model 602 can use R2D2, which uses a single CNN for jointly learning a sparse keypoint detector (avoiding ambiguous areas based both on repeatability and reliability of the points) together with a dense descriptor with a predictor of local descriptor discriminativeness.

Figure 7:
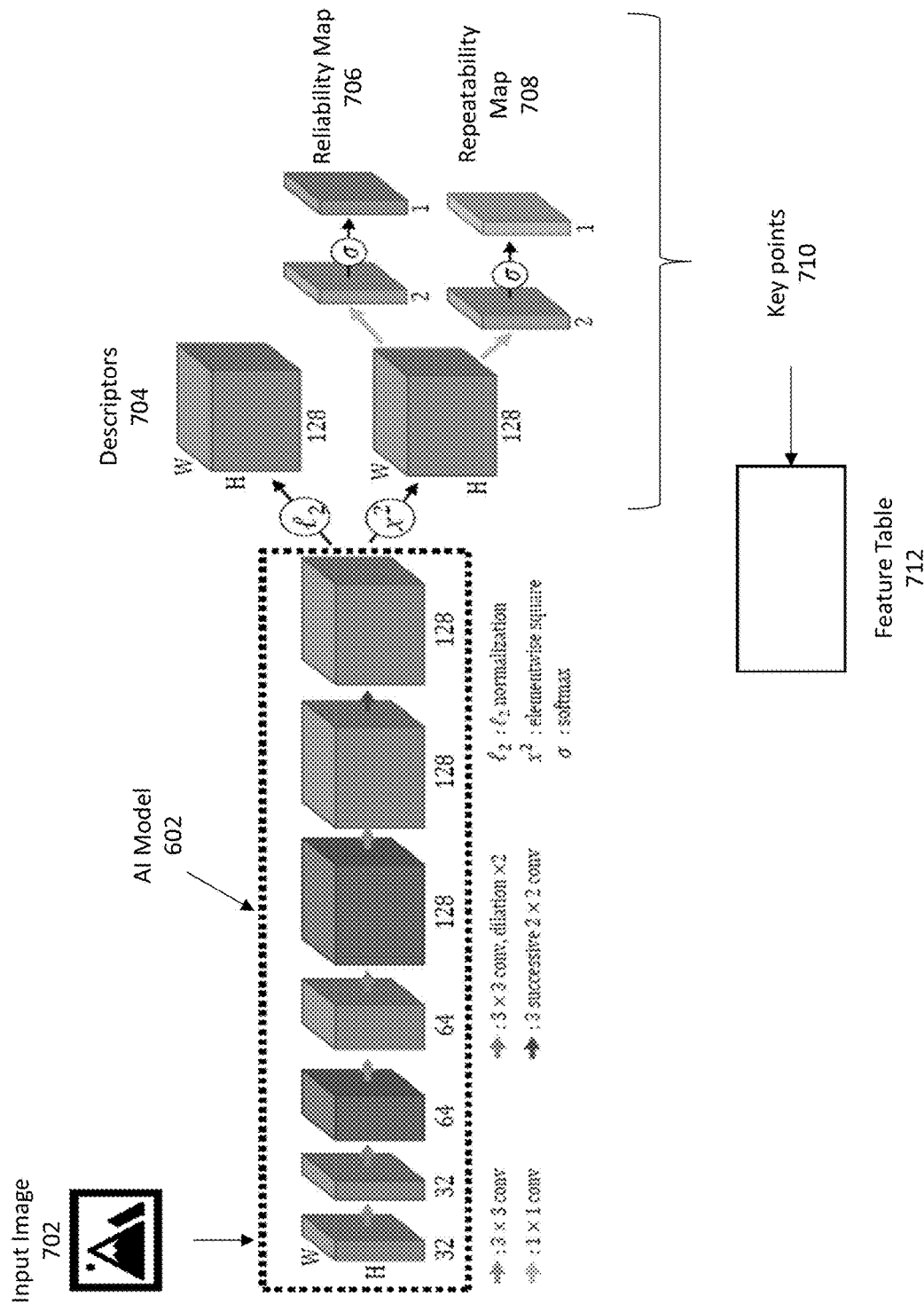
FIG. 7 depicts an example structure of an artificial intelligence model according to one or more examples.

FIG. 7 depicts an example structure of the AI model 602 according to one or more examples. The AI model 602 receives an input image 702, such as the left image 506, or the right image 508. The AI model 602 that is depicted is a fully connected L2 CNN, however, a different implementation can be used in other examples. The AI model 602 that is depicted includes several layers that perform convolution operations with the input data and one or more filters of predetermined sizes. The values of the filters are predetermined during a training phase during which the values are adjusted by comparing the output of the AI model 602 with ground truth. The AI model 602 outputs descriptors 704 as well as two dense confidence maps (the same size of input image 702) representing repeatability 708 and reliability 708 for each pixel of the input image 702, from which the locations of the keypoints are derived.

The AI model 602, accordingly, operates as a feature "detector," i.e., which is an algorithm which takes an input image 702 and outputs keypoints "locations" (i.e., pixel coordinates) of significant areas in the input image 702. An example is a corner detector, which outputs the locations of corners in the input image 702. In addition, the AI model 602 operates as a feature "descriptor," i.e., an algorithm which takes the input image 702 and outputs feature descriptors 704 (feature vectors). In some examples, the feature descriptors 704 encode the detected information into a series of numbers and act as a "fingerprint" or "signature" that can be used to differentiate one feature from another. The descriptors 704 are invariant under image transformation, so we can find the feature again even if the image is transformed in some way, e.g., rotated, zoomed, etc. An example algorithm that can be used to generate such descriptors is SIFT, which encodes information about the local neighborhood image gradients into numbers of the feature vector. Other examples can be used in the AI model 602 to generate the descriptors 704.

Figure 8:
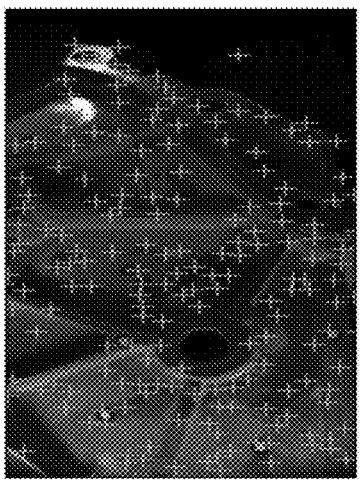
FIG. 8 depicts an example output from the an artificial intelligence model for a particular input image.
Figure 8:
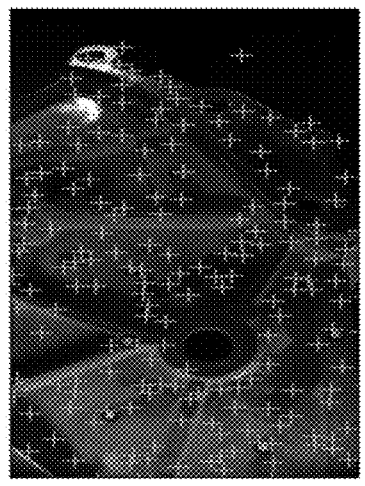

FIG. 8 depicts an example output from the AI model for a particular input image. It is understood that the output will vary as the input image 702 is changed, or if any parameters associated with the AI model 602 are configured in other examples. FIG. 8 includes a first set of outputs for an input image 702 at a first timepoint Ti, and a second set of outputs for another input image 702 at a second timepoint Ti+1. The reliability 706 and the repeatability 708 scores are depicted using color variations. It is understood that the color gradation can be different in other examples, and also that such visual depiction of the reliability 706 and the repeatability 708 scores is not required at each timepoint.

The repeatability 708 and reliability 708 for each pixel of the input image 702, can respectively be used as a score for determining which pixels in the input image 702 are to be used as a keypoint 710. For example, each of the scores is respectively compared with a first predetermined threshold, and a second predetermined threshold. A pixel that satisfies both, the first predetermined threshold and the second predetermined threshold, is used as a keypoint 710. Additionally, or alternatively, in some examples the two scores are combined to compute (e.g., weighted sum, or any other combination) a keypoint-score for each pixel in the input image 702. The keypoint-score for a pixel is compared with a (third) predetermined threshold to determine whether that pixel can be used as a keypoint 710. In some examples, each of the pixel is used as a keypoint with the corresponding scores recorded.

As shown in FIG. 6, the AI model 602 outputs, for each image (506, 508) in the stereo image 504, the corresponding keypoints 710, descriptors 704, at block 604. The scores associated with each keypoint 710 are also part of the output. The outputs for each image (506, 508) are compared, at block 606. The comparison can include using a matching algorithm, such as KNN (k-nearest neighbor). The matching algorithm is used to analyze the descriptors 704 and to output the nearest-neighbours in the descriptors space. In some examples, the matching algorithm uses additional constraints based on the epipolar geometry of the stereo configuration (block 608). The epipolar geometry refines the matches because the two cameras used for capturing the stereo image 504 view a 3D scene (target surface 502) from two distinct positions. There are a number of geometric relations between the 3D points and their projections onto the 2D images (506, 508) that lead to constraints between the image points.

The matching keypoints 710 from both images 506, 508, are output (block 612) including the 2D coordinates and corresponding descriptors 704. In some examples, an estimation of the 3D coordinates of the matching keypoints 710 is also output. The 3D coordinates are estimated based on (undistorted) pixels triangulation (block 610).

Figure 9:
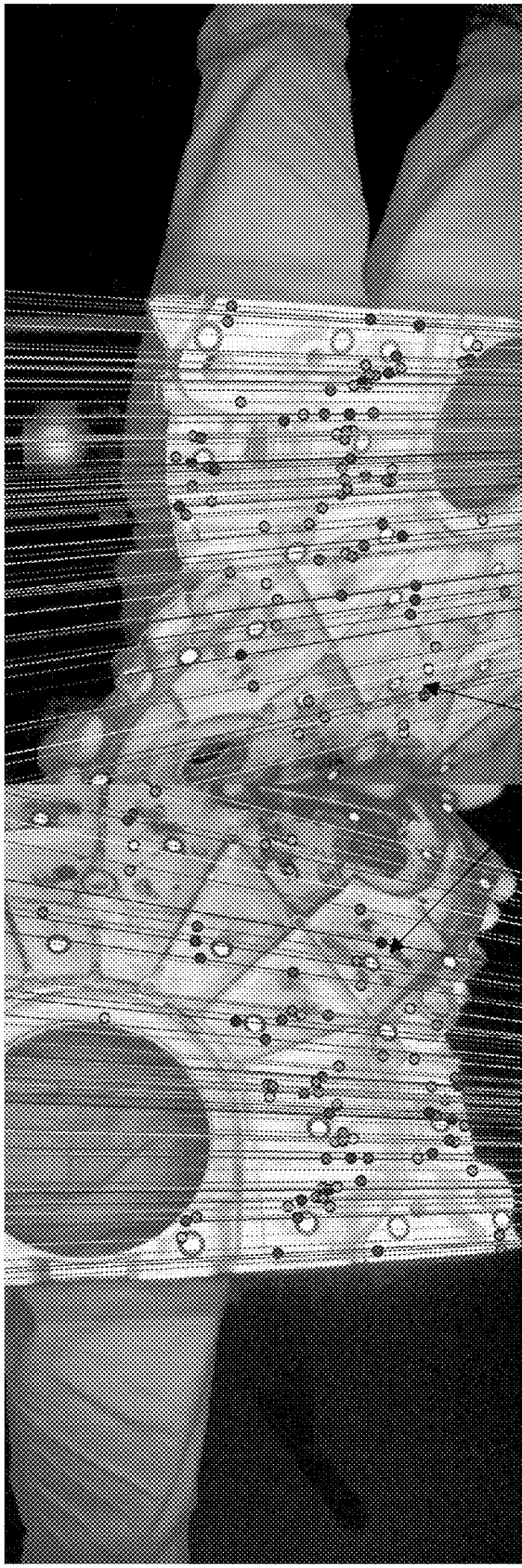
FIG. 9 depicts an example output of stereo matching.

FIG. 9 depicts an example output of stereo matching. It is understood that the output of the stereo matching is not displayed at each timepoint. FIG. 9 also depicts epipolar geometry lines for reference. The left 506, and right 508 images that are depicted are captured at the same timepoint, say timepoint Ti.

Referring to the flowchart of method 400, the matching keypoints 710 are recorded as natural features to be used further, at block 406. In one or more examples, the matching keypoints 710 are recorded in a data structure, e.g., a feature table 712. The feature table 712 is a data structure, such as a list, an array etc. Alternatively, or in addition, the feature table 712 is a database.

Accordingly, at each timepoint T, using the stereo image 504 captured at the timepoint T, one or more natural features are identified. Identifying the one or more natural features includes determining, using machine learning, a first set of keypoints 710 and corresponding descriptors 704 from the first image 506, and a second set of keypoints 710 and corresponding descriptors 704 from the second image 508. The two sets of keypoints 710 are compared using the descriptors 704 to identify one or more matching keypoints 710. These keypoints are stored in the feature table 712.

Referring to the flowchart in FIG. 4, the method 400 further includes, at a periodic timepoint Tx, performing a time matching, at block 408. Time matching facilitates search of the nearest neighbors in the descriptors space of two images captured at different timepoints, e.g., two left images 506 captured at Tx−1 and Tx, or two right images 508 captured at Tx−1 and Tx. In some examples, the two timepoints may be sequentially adjacent, i.e, timepoint Ti, and Ti+1. Alternatively, the time matching is performed at a different periodicity p, i.e., for images captured at Tx and Tx−p. For example, p=5, i.e., every Pith timepoint (p=5: Tx, and Tx−5); p=10, i.e., every tenth timepoint (Tx and Tx−10), etc. It should be noted that in the case where every pair of sequential image is use for time matching, the period p=1.

Figure 10:
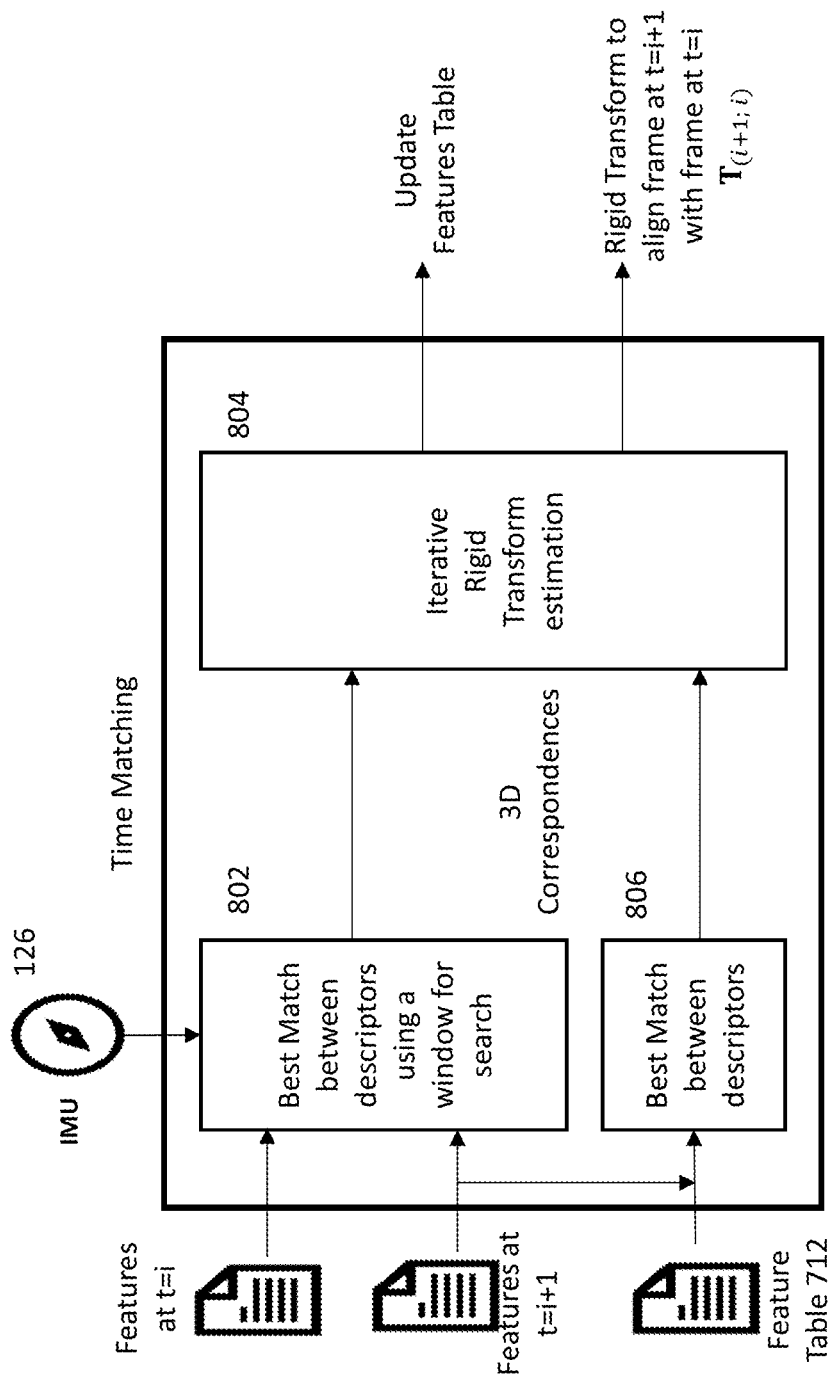
FIG. 10 depicts an operational flow for performing time matching according to one or more examples.

FIG. 10 depicts an operational flow for performing time matching according to one or more examples. In block 802, at the periodic timepoint Tx, the features that are identified using the stereo matching (404), are compared with the features that were identified using stereo matching at the earlier timepoint Tx−p. For example, for each feature that was identified in the image from Tx−p, a corresponding feature is searched in the image from Tx. The matching is performed by comparing the descriptors 704 from the images captured at the two timepoints, Tx and Tx−p.

Figure 11:
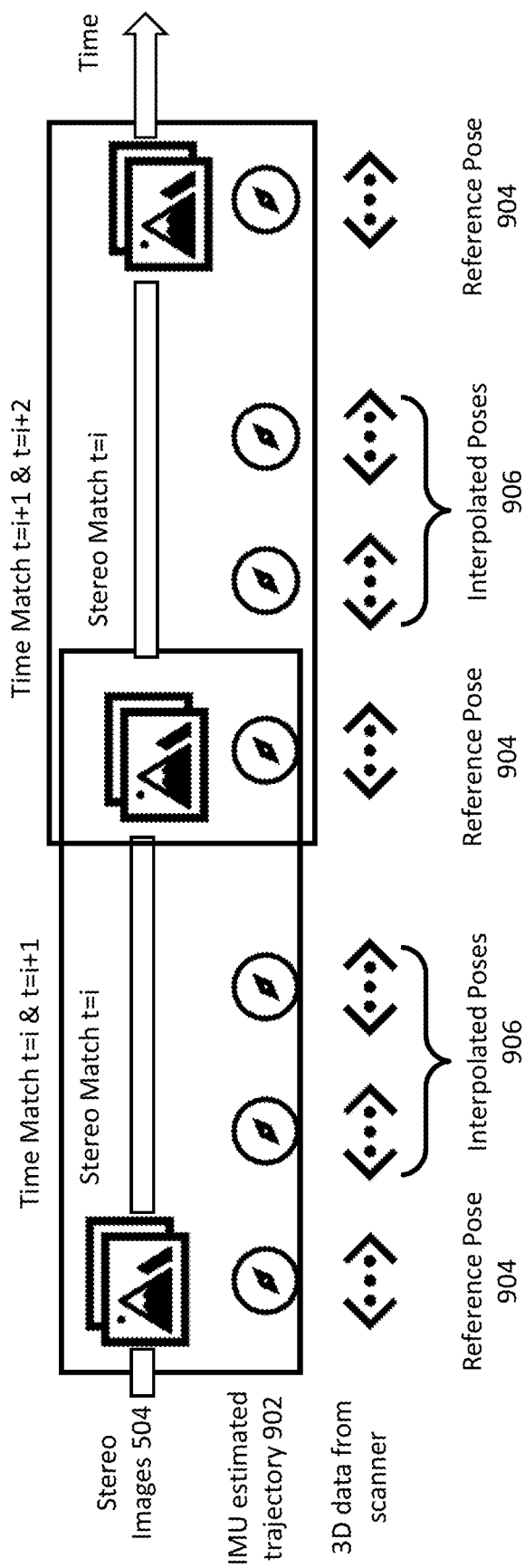
FIG. 11 depicts an operational flow of using an inertial measuring unit to determine a search window to boost the acquisition system frame rate.

In one or more examples, time matching is further improved by leveraging the IMU 126 for determining a window/area of search, to reduce the number of potential candidates to compare. In some cases, for example, if the IMU 126 is not available, interpolating the trajectory and/or fitting the trajectory can be used to improve the time matching. FIG. 11 depicts an operational flow of using the IMU 126 to determine a search window 512 to boost the acquisition system frame rate: 3D data acquisition made with the scanner device 120. The IMU trajectory estimation (902) can work at a higher frequency than the frequency of timepoints T used for stereo (and time) matching. Therefore, with two poses of the scanner device 120 estimated using the features from the 3D data from the scanner device 120, they can be used as reference poses (904) and to compute interpolated poses 906 using the IMU information. The data from IMU 126 is used to to estimate the in between scanner device poses, synchronized with 3D scanner data to increase the number of lines registered per second.

Referring back to FIG. 10, the matching features from Tx, and Tx−p are used to determine a rigid transform estimation, at 804. The rigid transform indicates a change in the pose of the scanner device 120 between the data captured at Tx−p and at Tx. The rigid transform estimation can be performed using any techniques, such as the Horn algorithm, Walker algorithm, etc.

Alternatively, or in addition, the features identified at the timepoint Tx are compared with the features recorded in the feature table 712, at 806. The comparison is performed by comparing the descriptors 704 at Tx with those stored in the feature table 712. The IMU 126 can be used to determine the search window 512 to reduce the number of features searched from the feature table 712. The matching features from the feature table can also be used to estimate the rigid transform (804) in one or more examples.

As depicted in FIG. 4, the method 400 further includes determining the pose of the scanner device 120 by updating an earlier pose from the timepoint Tx by the rigid transform estimation, at block 412. The rigid transform estimation, and pose of the scanner device is computed using 3D coordinates corresponding to the set of natural features in one or more examples. The 3D coordinates are determined by identifying, in the point cloud captured by the scanner device 120, a point corresponding to each respective natural feature from the set of natural features. As noted, the 3D coordinates can be estimated using triangulation, or any other techniques.

Figure 12:
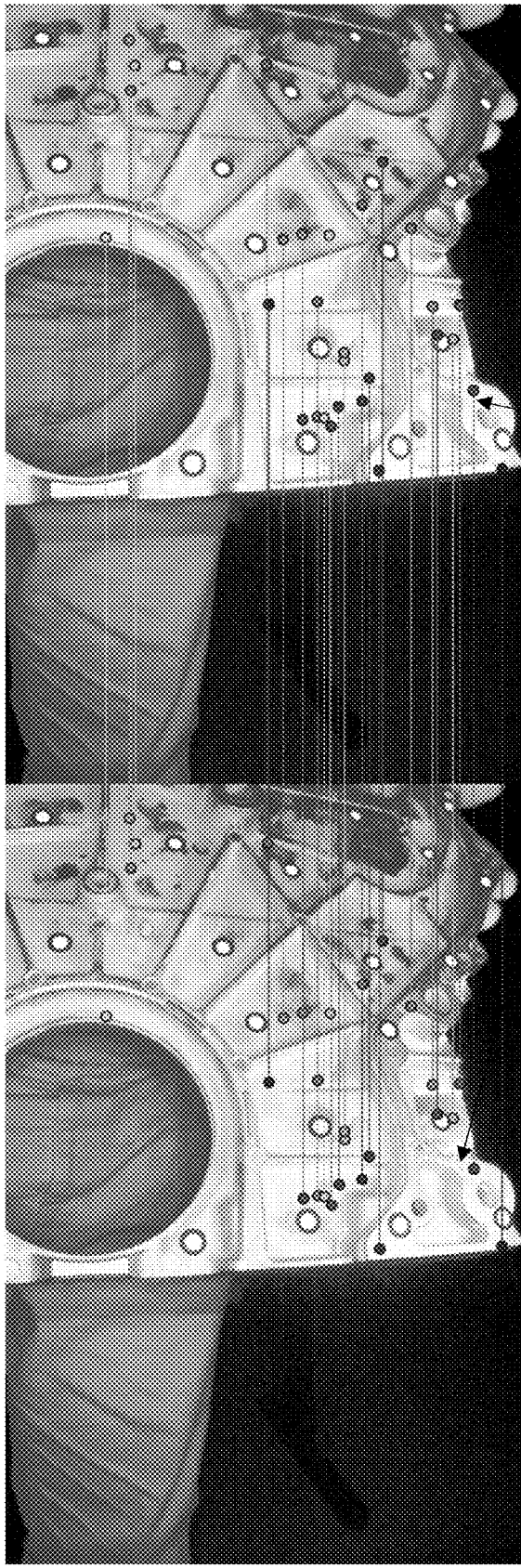
FIG. 12 depicts an example scenario of time matching where the matching features from left images from timepoints Tx and Tx−p are depicted.

FIG. 12 depicts an example scenario of time matching where the matching features from left images 506 from timepoints Tx and Tx−p are depicted. It is understood that in other examples, right images 508 can be used to identify the matching features at different timepoints.

Further, in one or more examples, the features that are determined to be matching at different timepoints can be updated in the feature table 712, at block 414. Each new matching feature extracted from timepoints Tx is compared with the features already stored into the feature table 712. According to different criteria, the new features can then be added standalone into the feature table 712 or used to refine an already present feature information or even discarded. An example of criteria is the Euclidean distance of the 3D coordinate associated to a new feature with respect to all the features already stored. Another example can be the evaluation of the distances into the descriptors space.

Accordingly, techniques described herein facilitate a targetless tracking of data captured by a scanner device 120, and aligning and registering the captured data. Such alignment and registration improve the performance of the scanner device, such as to implement a simultaneous locating and mapping.

Further, if the same natural features are detected in multiple images (at different timepoints), the natural features are used as a constraint for matching of the multiple images during the local SLAM. The natural features are also used for initialization to generate submaps consisting of multiple matched data. This matching may be implemented as nonlinear optimization with a cost function. In one or more examples, the cost function can include equations for the distance of the natural features from the scanner device 120 to improve the accuracy and robustness of the SLAM algorithm. Further, in one or more examples, the natural features can be used in some situations to improve the robustness and speed of optimization during initialization of the SLAM algorithm.

Additionally, the natural features can be reused as indicator for loop closure in the case where the feature can be identified globally. If multiple such natural features are identified between two submaps the loop closure can be evaluated using the timestamp and the natural features for the alignment of the multiple submaps.

The natural features can also be used in the global SLAM optimization as constraints for the connection between the submaps and the orientation of the scanner device 120.

Once the loop closure is completed, the global SLAM 214 is completed by registering 226 the submaps and stitching the submaps to generate the map 130. In one or more examples, SLAM 210 is performed iteratively as newer measurements are acquired by the scanner device 120.

Referring to FIG. 1 again, the computing system 110 can be a desktop computer, a laptop computer, a tablet computer, a phone, or any other type of computing device that can communicate with the scanner device 120. In an example, the computing system 110 is a portable computing device that is carried by the operator during scanning operations (e.g. clipped to a belt or carried in a pouch or pocket).

One or more operations for implementing SLAM can be performed by the computing system 110. Alternatively, or in addition, one or more of the operations can be performed by a processor 124 that is equipped on the scanner device 120. In one or more examples, the processor 124 and the computing system 110 can implement SLAM in a distributed manner. The processor 124 can include one or more processing units. The processor 124 controls the measurements performed using the set of sensors 122. In one or more examples, the measurements are performed based on one or more instructions received from the computing system 110.

In one or more examples, the computing device 110 and/or a display (not shown) of the scanner device 120 provides a live view of the map 130 of the environment being scanned by the scanner device 120 using the set of sensors 122. Map 130 can be a 2D or 3D representation of the environment seen through the different sensors. Map 130 can be represented internally as a grid map. A grid map is a 2D or 3D arranged collection of cells (2D) or voxels (3D), representing an area of the environment. In one or more examples, the grid map stores for every cell/voxel, a probability indicating if the cell area is occupied or not. Other representations of the map 130 can be used in one or more examples.

As noted earlier, the scanner device 120, along with capturing the map 130, is also locating itself within the environment. The scanner device 120 uses odometry, which includes using data from motion or visual sensors to estimate the change in position of the scanner device 120 over time. Odometry is used to estimate the position of the scanner device 120 relative to a starting location. This method is sensitive to errors due to the integration of velocity measurements over time to give position estimates.

It should be noted that the implementation of the SLAM, local and global, itself is known, and also that one or more examples herein provide accurate data that can be used by such an implementation to provide an improved result of the SLAM implementation. The examples of technical solutions herein, accordingly, facilitate improvement to computing technology. Further, examples of technical solutions herein provide a practical application that facilitates generating the map 130 of an environment.

The natural features that are detected automatically using machine learning by the technical solutions herein improve the implementation of SLAM. Typically, SLAM is implemented in batches in a continuous manner. For example, after the scanner device 120 has moved a predetermined distance, for example, 5 meters, 10 meters, 2 meters, or any other such predetermined distance, SLAM is performed to combine the measurement data captured over that traveled distance, i.e., since the last iteration of SLAM. Such a periodic batch performance is used to reduce time spent on the SLAM computations. In one or more examples, SLAM can be executed in a continuous manner at the expense of a larger number of computations. It should be noted that in existing systems, the accuracy of the measurements starts drifting, i.e., decreasing as the scanner is moved shorter distances than the predetermined distance used for performing SLAM, for example, 10-15 centimeter. Accordingly, even with measures like loop closure, compensating for such inaccuracies over the span of a relatively large area such as a building, which can be 100 meters, 250 meters, etc., i.e., substantially larger than the distance at which errors start accumulating, is a technical challenge.

In existing systems, the manual step that is required for identifying the targets in each iteration, can add to the error. One or more examples of the technical solutions described herein address such a challenge and improve the workflow by using machine learning to automatically detect natural features, and then identifying the features in subsequent scans/measurement data.

Figure 13:
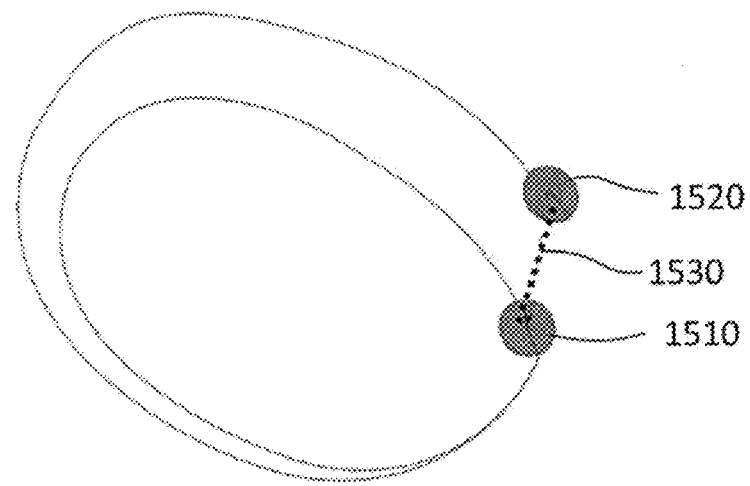
FIG. 13 schematically illustrates an example scenario in which an offset is continuously introduced into the scan data.

In some examples, the natural features that are detected using technical solutions herein, are used to perform a loop closure algorithm, at block 416. FIG. 13 schematically illustrates an example scenario in which an offset (referred to as "drift") is continuously introduced into the scan data. Consider that the scanner device 120 is moving from a starting position 1510 (real pose). After some movements the scanner device 120 is designated to return to an already mapped region, such as the starting position 1510, however the measured position due to sensor variation and the subsequent measurement error is a different position 1520 (estimated pose). The loop closure algorithm(s) that are typically used detect the loop closure correction 1530 and corrects the pose and the maps that have been acquired so far by the scanner device 120. As a consequence, all positions in the map 130, including the scan positions 810, the registration points, and the points scanned and stored in the scans, change their coordinates based on the loop closure correction 1530. In a pure mapping application this may not introduce inefficiencies or other issues, however for the scanner device 120 that uses scans from different scan positions, such a change in map coordinates leads to errors/inefficiencies because the scan positions are recorded before they are not automatically adapted in this manner.

Figure 14:
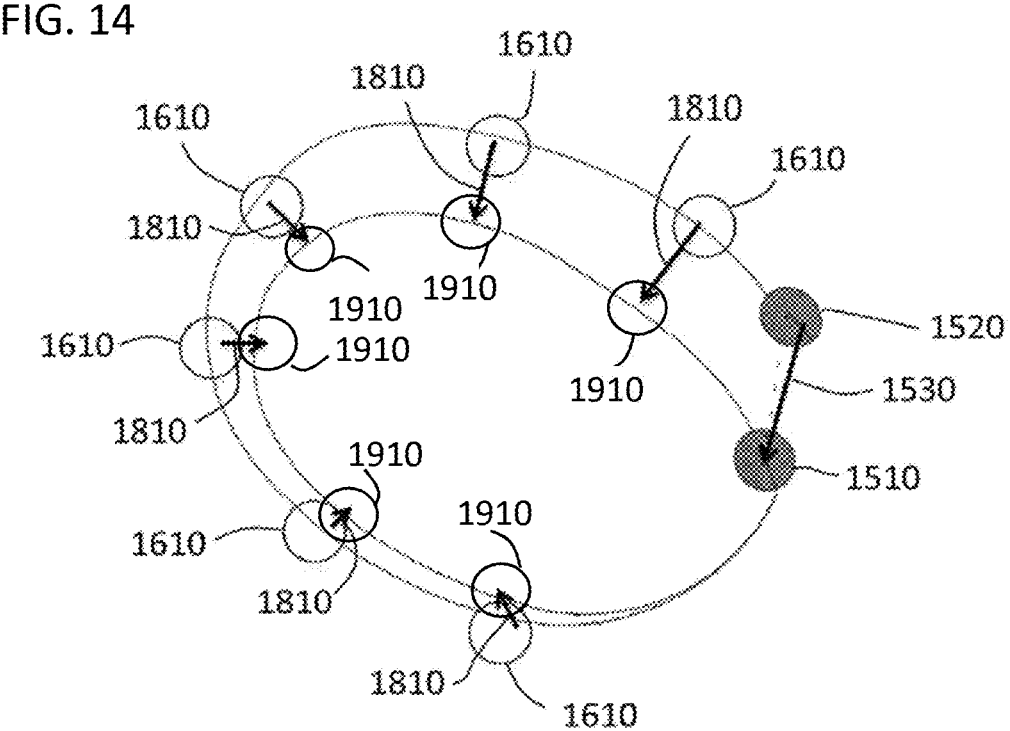
FIG. 14 illustrates the accumulation of errors and inefficiencies in an example scenario.

For example, FIG. 14 illustrates the accumulation of errors and inefficiencies. The scanner device 120 starts moving from the start position 1510. After some movement the scanner device 120 takes a scan as described herein from one of a plurality of scan positions 1610. When the scanner device 120 arrives back in the start position 1510 the measurement error due to sensor data variance causes the estimated pose 1520 to differ from the start position 1510. After loop closure the recorded scan positions still have the same coordinates including the error while the map was corrected by the loop closure algorithm. Consequently, the estimated positions of the scans have a deviation. As described earlier when the loop closure is applied all positions in the map change. But as the scan positions 1610 have been recorded before, the scan positions are not automatically adapted. As a consequence, there are offsets between the scan positions 1610 and the map acquired by the scanner device 120. The error in a scan position and consequently the error of distance in the generated maps accumulates as the scanner device 120 is used. Accordingly, the longer the path taken by the scanner device 120, the larger the error(s) in the scan positions. By using a registration process (such as Cloud2Cloud registration for example) for the scans the errors in the scan positions 1610 can be corrected in the measurement data. However, such registration process requires additional processing power and time, which may be inefficient.

Accordingly, the loop closure can be performed using the natural features that are detected using machine learning as described herein. The relative observation of a landmark from the scanner device 120 delivers an accurate position information and can correct the position of the scanner device 120 in the absolute world and remove absolute inaccuracies accumulated from the mapping process. The more landmarks (observed with a good accuracy) the better the position accuracy of the scanner device 120 and consequently the absolute accuracy of the maps scanned by the scanner device 120. It should be noted that as used herein, "absolute accuracy" is the accuracy of measurements of a map that is scanned compared to a ground truth. For example, a side wall of a building has a real length of 100 m. The side wall when measured by the scanner device 120 is 101.1 m. In this case, there is an absolute error of 1.1 m and an absolute accuracy of >1.1 for distance>100 m. Such kind of errors in the scan positions are mitigated using loop closure.

Figure 15:
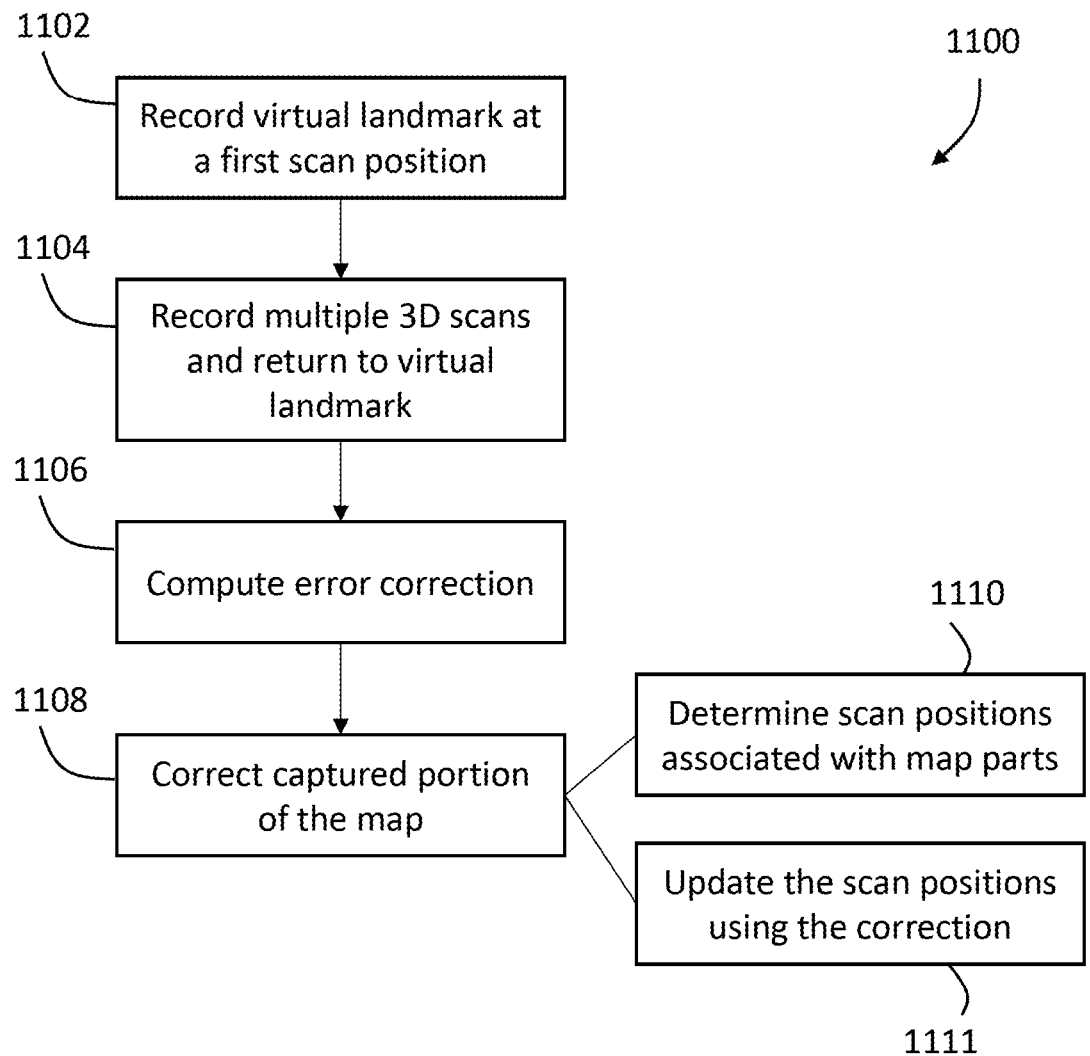
FIG. 15 depicts an example method for correcting scan positions using landmarks from semantic features while performing a scan according to one or more embodiments.

FIG. 15 depicts an example method 1100 for correcting scan positions using landmarks from semantic features while performing a scan according to one or more embodiments. In one or more examples, the operator stops and starts to record a scan with the scanner device 120 at a first scan position from the scan positions 1610 (FIG. 14). In another example, the scanner device 120 automatically stops and starts to record the scan at the scan position 1610. Acquiring the scan includes determining with processor system, in cooperation with the scanner device 120, 3D coordinates of a first collection of points on an object surface while the scanner is located at a first registration position (e.g. position 1510) while the moveable platform moves through the environment. Further, acquiring the scan includes obtaining by the scanner device 120 in cooperation with the processor system a plurality of 2D scan sets. Each of the plurality of 2D scan sets is a set of 2D coordinates of points on the object surface collected as the scanner device 120 moves from the first registration position (1510) to a second registration position (e.g. position 1610). Each of the plurality of 2D scan sets is collected by the scanner device 120 at a different position relative to the first registration position 1510. The plurality of the 2D scan sets are together referred to as a 2D map and each of the scan sets is a part of the map 130.

Referring now to the flowchart in FIG. 15, one or more natural features are recorded when the scanner device 120 is at a first scan position 1510, at block 1102. The natural features are detected, automatically. The scan is saved as complementary data with the scan position 1510 in one or more examples. In one or more examples, the natural features are represented, e.g., using flags (or any other marker) in the map 130. The present scan position 1510 of the scanner device 120 is recorded as part of the scan.

In one or more examples, the scanner device 120 detects the natural features in the environment as the mapping is being performed.

The scanner device 120 continues to capture scans at multiple other scan positions 1610 and returning to the first scan position, at block 1104. Capturing the present position procedure is repeated for every scan captured by the scanner device 120. For example, if the scanner device 120 captures n scans a data structure holds n positions with n links to the corresponding measurement data of the portion scanned. In one or more examples, the scanner device 120 saves the present position in a data structure such as a list of positions. Every position in the data structure is directly linked to the data structure that is used to store the measurements of the corresponding portion of the environment.

At the position 1510 where the natural features were detected earlier, the scanner device 120 computes the measurement error 1530 that is input into the SLAM algorithms to correct the error/drift accumulated from walking or moving the scanner around the scanned portion of the environment, at block 1106. In one or more examples, computing the measurement error 1530 includes moving the scanner device 120 to an estimated position 1520. The estimated position is an estimate of the first scan position 1510 where the natural features were recorded. The difference 1530 between the recorded position 1510 of the virtual landmark and the present position 1520 is used as the error correction to update and correct the mapping positions.

In one or more examples, the difference is computed as a difference in the original image 1220 and the present view 1230 when the scanner device 120 is at substantially the same location. For example, the difference between the images is computed based on the natural features in the images.

The method 1100 further includes using the measurement error 1530 to correct the coordinates captured by the scanner device 120, at block 1108. The portion of the map 130 that is scanned and stored since detecting the natural features is updated using the measurement error 1530, in one or more examples. In one or more examples, a loop closure operation is executed on the map 120, and parts of the map are corrected in order to match the real pose, which is the starting position 1510, with the estimated pose, which is the different position 1520. The loop closure algorithm calculates a displacement for each part of the map 130 that is shifted by the algorithm.

In one or more examples, the scanner device 120 determines the scan positions 1610 linked to each portion of the map 130, at block 1110. In one or more examples, a lookup is performed over the data structure that saves the list of positions. The lookup costs a single processor operation, such as an array lookup. The scanner device 120 (or computer system 110) applies the displacement vector for a portion of the map 130 to the corresponding scan positions saved in the data structure and saves the resulting displaced (or revised) scan positions back into the data structure, at block 1111. The scanner device 120 computes displaced scan positions for each of the saved scan positions 1610 in the data structure. The procedure can be repeated every time the loop closure algorithm is applied.

The displaced scan positions represent corrected scan positions of the scans that can be used directly without applying further computational expensive point cloud registration algorithms. The accuracy of the scan positions 1610 depends on the sensor accuracy of the scanner device 120.

As shown in FIG. 14, the displacement vectors 1810 for the portions of the map 130 are determined based on the loop closure operation. The scanner device 120 applies the displacement vectors 1810 to the scan positions 1610 linked to the portions of the map by the data structure as described herein. The resulting displaced scan positions 1910 are accordingly calculated by applying the displacement vectors 1810 to the scan positions 1610. The displaced scan positions 1910 are now correctly located.

Referring again to the flowchart in FIG. 4, the method 400 includes determining a constraint for SLAM implementation based on the landmarks that are determined using the natural features, at block 418. Determining the constraints includes generating a relationship by matching the natural features that are detected from a first position 1610 with corresponding (same) landmarks that are detected in an earlier frame. Each frame is captured at a particular pose of the scanner device 120. The pose can include a position (i.e., coordinates in the environment), and orientation of the scanner device 120.

The scanner device 120 moves from the first position to the second position at a predetermined speed, for example, R meters per second. In addition, the scanner device 120 is configured to capture successive frames at a predetermined frequency, for example, 10 Hz, 15 Hz, etc. In one or more examples, the computing system 110 processes the captured frames at a second predetermined frequency, for example, 30 Hz, 45 Hz, etc. Further, consider that the stereo image 504 has a natural feature a, that is captured at a position x in the scan from the first position; and further, that the landmark a, is at a position y in the second scan that is captured from the second position.

Matching the landmarks detected from the first position 1610 and those detected from the second position 1620 includes determining the matching natural features (a) from the two positions.

Once a, is determined, the matching further includes determining a relationship between the positions of the same landmark from the separate scan positions. The relationship can be a mapping between the point x that represents the landmark from the first position, and the point y that represents the same landmark from the second position. For example, the computing system 110 determines a mapping such as $Hx \approx y$. Here, H can be a matrix that translates and rotates x, where x and y can be 2D or 3D coordinates. In one or more examples, x and y can be matrices that represent more than one point. H is a relative measurement constraint that can be used by the scanner when implementing the SLAM algorithm.

The method 400 further includes executing the SLAM algorithm, at block 420. The SLAM algorithm can be implemented by the computing system 110, and/or the processor 124. Such use of the constraints generated from the landmarks and/or the semantic features 830 improves the final result of the SLAM algorithm.

As an example, consider the use of a natural feature that can be seen by the scanner device 120 from various locations, which would be relative measurement constraints every time the scanner sees a natural feature. So, SLAM can use those constraints in order to find the most likely configuration of the scanner path along with the location of natural features.

Examples of the technical solutions herein facilitate improvements to results of SLAM as well as loop closure, and consequently an improved scanning system for generating maps of an environment.

Figure 16:
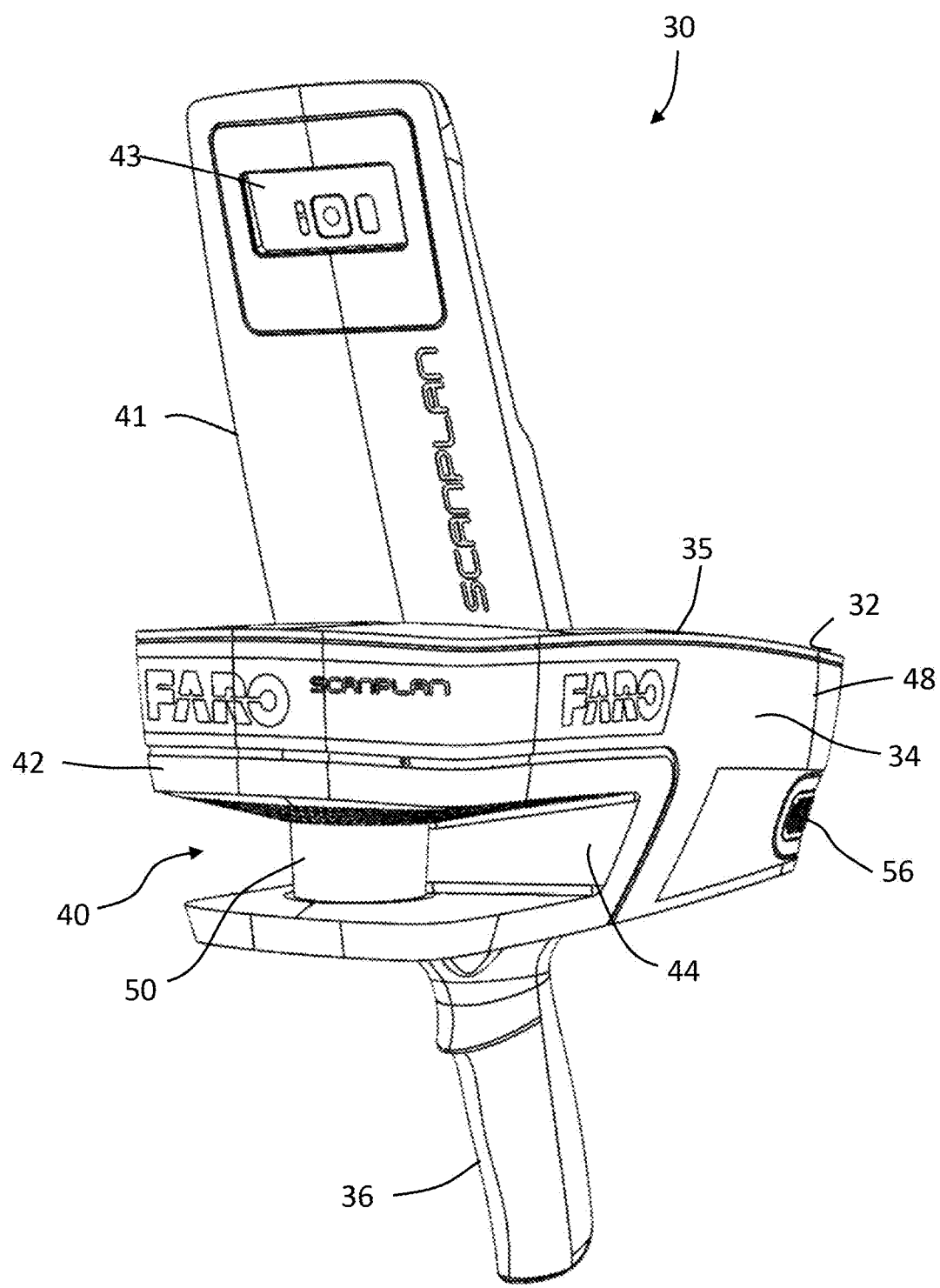
FIG. 16 depicts an example of a scanner according to one or more examples.
Figure 17:
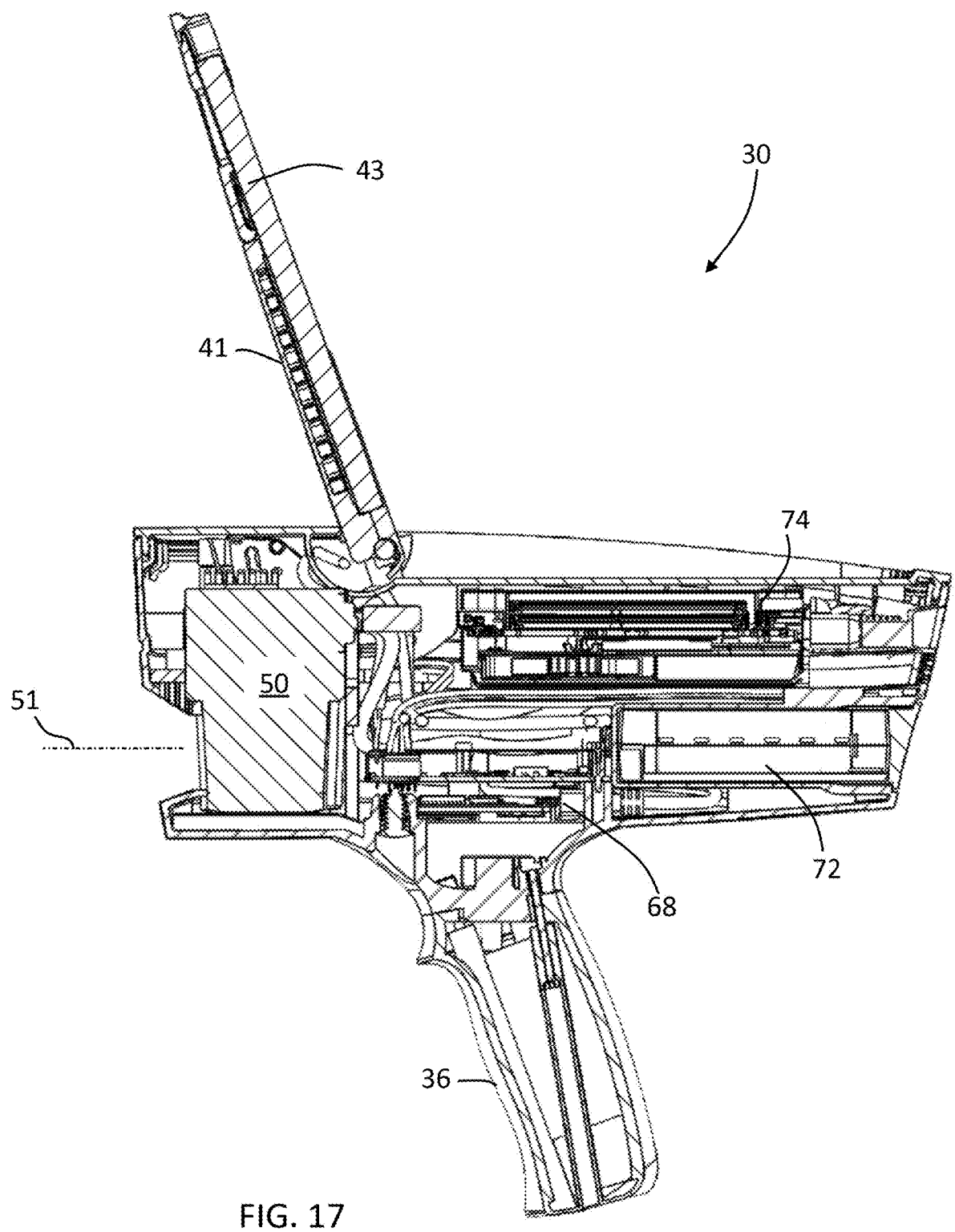
FIG. 17 depicts an example of a scanner according to one or more examples.
Figure 18:
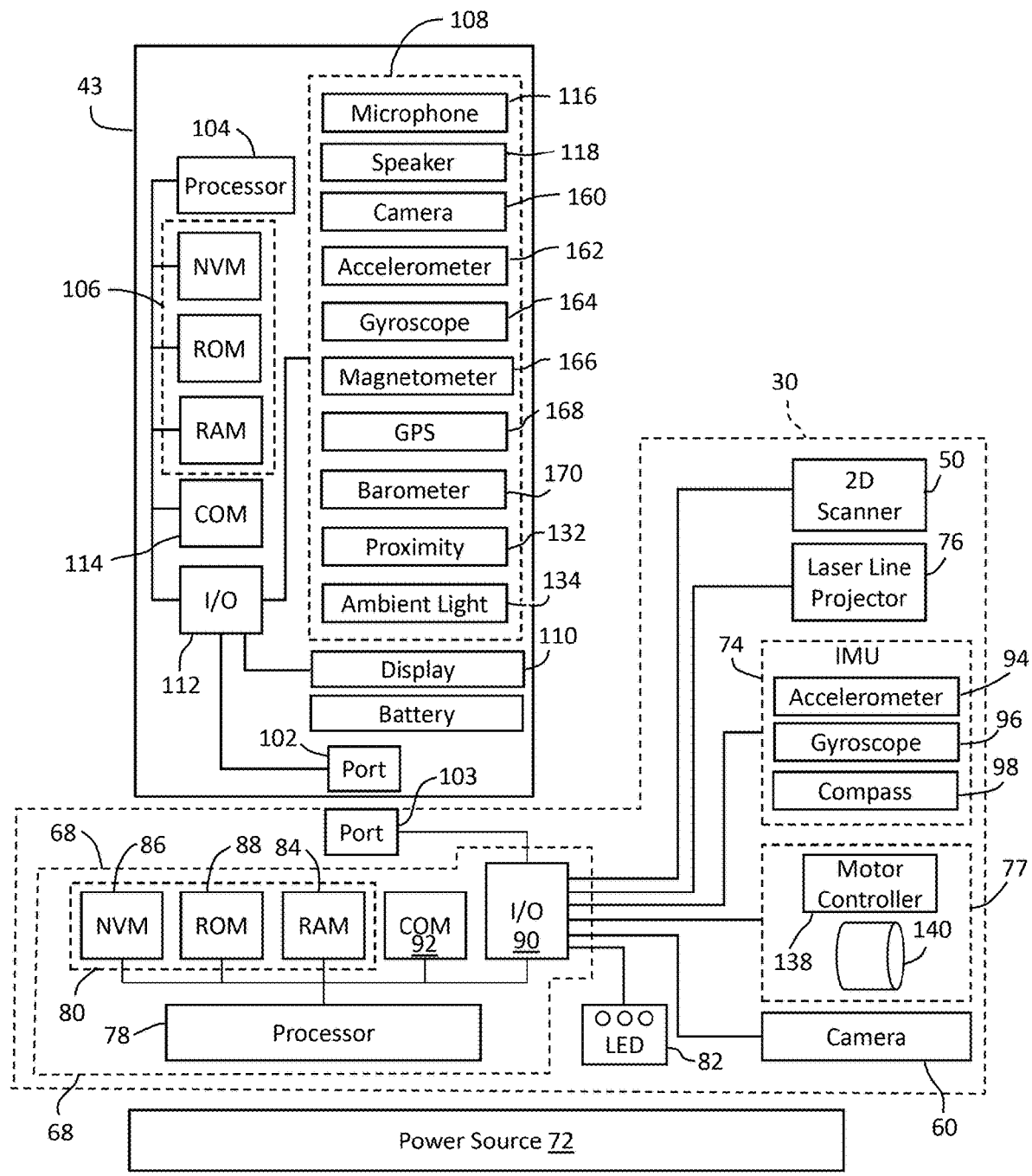
FIG. 18 depicts an example of a scanner according to one or more examples.

FIG. 16, FIG. 17, and FIG. 18 depict an example of a system 30 having a housing 32 that includes a body portion 34 and a handle portion 36. The system 30 can be used as the scanner device 120. In an example, the handle 36 may include an actuator 38 that allows the operator to interact with the system 30. In the exemplary embodiment, the body 34 includes a generally rectangular center portion 35 with a slot 40 formed in an end 42. The slot 40 is at least partially defined by a pair walls 44 that are angled towards a second end 48. As will be discussed in more detail herein, a portion of a two-dimensional scanner 50 is arranged between the walls 44. The walls 44 are angled to allow the scanner 50 to operate by emitting a light over a large angular area without interference from the walls 44. As will be discussed in more detail herein, the end 42 may further include a three-dimensional camera or RGBD camera 60.

Extending from the center portion 35 is a mobile device holder 41. The mobile device holder 41 is configured to securely couple a mobile device 43 to the housing 32. The holder 41 may include one or more fastening elements, such as a magnetic or mechanical latching element for example, that couples the mobile device 43 to the housing 32. In an example, the mobile device 43 is coupled to communicate with a controller 68. The communication between the controller 68 and the mobile device 43 may be via any suitable communications medium, such as wired, wireless or optical communication mediums for example.

In the illustrated embodiment, the holder 41 is pivotally coupled to the housing 32, such that it may be selectively rotated into a closed position within a recess 46. In an example, the recess 46 is sized and shaped to receive the holder 41 with the mobile device 43 disposed therein.

In the exemplary embodiment, the second end 48 includes a plurality of exhaust vent openings 56. In an example the exhaust vent openings 56 are fluidly coupled to intake vent openings 58 arranged on a bottom surface 62 of center portion 35. The intake vent openings 58 allow external air to enter a conduit 64 having an opposite opening 66 in fluid communication with the hollow interior 67 of the body 34. In an example, the opening 66 is arranged adjacent to a controller 68 which has one or more processors that is operable to perform the methods described herein. In an example, the external air flows from the opening 66 over or around the controller 68 and out the exhaust vent openings 56.

The controller 68 is coupled to a wall 70 of body 34. In an example, the wall 70 is coupled to or integral with the handle 36. The controller 68 is electrically coupled to the 2D scanner 50, the 3D camera 60, a power source 72, an inertial measurement unit (IMU) 74, a laser line projector 76, and a haptic feedback device 77.

Elements are shown of the system 30 with the mobile device 43 installed or coupled to the housing 32. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 can convert the analog voltage or current level provided by 2D scanner 50, camera 60 and IMU 74 into a digital signal to determine a distance from the system 30 to an object in the environment. In an example, the camera 60 is a 3D or RGBD type camera. Controller 68 uses the digital signals that act as input to various processes for controlling the system 30. The digital signals represent one or more system 30 data including but not limited to distance to an object, images of the environment, acceleration, pitch orientation, yaw orientation and roll orientation. As will be discussed in more detail, the digital signals may be from components internal to the housing 32 or from sensors and devices located in the mobile device 43.

In general, when the mobile device 43 is not installed, controller 68 accepts data from 2D scanner 50 and IMU 74 and is given certain instructions for the purpose of generating a two-dimensional map of a scanned environment. Controller 68 provides operating signals to the 2D scanner 50, the camera 60, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on the mobile device 43.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, a read-only memory (ROM) device 88. In addition, the processors 78 may be connected to one or more input/output (I/O) controllers 90 and a communications circuit 92. In an example, the communications circuit 92 provides an interface that allows wireless or wired communication with one or more external devices or networks, such as the LAN discussed above.

Controller 68 includes operation control methods described herein, which can be embodied in application code. These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an example, the 2D scanner 50 scans a spot of light over an angle while at the same time measuring an angle value and corresponding distance value to each of the illuminated object points.

Examples of 2D scanners 50 include but are not limited to Model LMS103 scanners manufactured by Sick, Inc of Minneapolis, MN and scanner Models URG-04LX-UG01 and UTM-30LX manufactured by Hokuyo Automatic Co., Ltd of Osaka, Japan. The scanners in the Sick LMS103 family measure angles over a 270-degree range and over distances up to 20 meters. The Hoyuko model URG-04LX-UG01 is a low-cost 2D scanner that measures angles over a 240-degree range and distances up to 4 meters. The Hoyuko model UTM-30LX is a 2D scanner that measures angles over a 270-degree range and to distances up to 30 meters. It should be appreciated that the above 2D scanners are exemplary and other types of 2D scanners are also available.

In an example, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 68 is the IMU 74. The IMU 74 is a position/orientation sensor that may include accelerometers 94 (inclinometers), gyroscopes 96, a magnetometer or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

The system 30 further includes a camera 60 that is a 3D or RGB-D camera. As used herein, the term 3D camera refers to a device that produces a two-dimensional image that includes distances to a point in the environment from the location of system 30. The 3D camera 30 may be a range camera or a stereo camera. In an example, the 3D camera 30 includes an RGB-D sensor that combines color information with a per-pixel depth information. In an example, the 3D camera 30 may include an infrared laser projector 31, a left infrared camera 33, a right infrared camera 39, and a color camera 37. In an example, the 3D camera 60 is a RealSense™ camera model R200 manufactured by Intel Corporation. In still another embodiment, the 3D camera 30 is a RealSense™ LIDAR camera model L515 manufactured by Intel Corporation.

In an example, when the mobile device 43 is coupled to the housing 32, the mobile device 43 becomes an integral part of the system 30. In an example, the mobile device 43 is a cellular phone, a tablet computer, or a personal digital assistant (PDA). The mobile device 43 may be coupled for communication via a wired connection, such as ports 103, 102. The port 103 is coupled for communication to the processor 78, such as via I/O controller 90 for example. The ports 103, 102 may be any suitable port, such as but not limited to USB, USB-A, USB-B, USB-C, IEEE 1394 (Firewire), or Lightning™ connectors.

The mobile device 43 is a suitable electronic device capable of accepting data and instructions, executing the instructions to process the data, and presenting the results. The mobile device 43 includes one or more processing elements 104. The processors may be microprocessors, field programmable gate arrays (FPGAs), digital signal processors (DSPs), and generally any device capable of performing computing functions. The one or more processors 104 have access to memory 106 for storing information.

The mobile device 43 can convert the analog voltage or current level provided by sensors 108 and processor 78. Mobile device 43 uses the digital signals that act as input to various processes for controlling the system 30. The digital signals represent one or more system 30 data including but not limited to distance to an object, images of the environment, acceleration, pitch orientation, yaw orientation, roll orientation, global position, ambient light levels, and altitude for example.

In general, mobile device 43 accepts data from sensors 108 and is given certain instructions for the purpose of generating or assisting the processor 78 in the generation of a two-dimensional map or three-dimensional map of a scanned environment. Mobile device 43 provides operating signals to the processor 78, the sensors 108 and a display 110. Mobile device 43 also accepts data from sensors 108, indicating, for example, to track the position of the mobile device 43 in the environment or measure coordinates of points on surfaces in the environment. The mobile device 43 compares the operational parameters to predetermined variances (e.g. yaw, pitch or roll thresholds) and if the predetermined variance is exceeded, may generate a signal. The data received by the mobile device 43 may be displayed on display 110. In an example, the display 110 is a touch screen device that allows the operator to input data or control the operation of the system 30.

The controller 68 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 104 are coupled to memory 106. The memory 106 may include random access memory (RAM) device, a non-volatile memory (NVM) device, and a read-only memory (ROM) device. In addition, the processors 104 may be connected to one or more input/output (I/O) controllers 112 and a communications circuit 114. In an example, the communications circuit 114 provides an interface that allows wireless or wired communication with one or more external devices or networks, such as the LAN or the cellular network discussed above.

Processor 104 includes operation control methods described herein, which can be embodied in application code. These methods are embodied in computer instructions written to be executed by processors 78, 104, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Also coupled to the processor 104 are the sensors 108. The sensors 108 may include but are not limited to: a microphone 116; a speaker 118; a front or rear facing camera 160; accelerometers 162 (inclinometers), gyroscopes 164, a magnetometers or compass 126; a global positioning satellite (GPS) module 168; a barometer 170; a proximity sensor 132; and an ambient light sensor 134. By combining readings from a combination of sensors 108 with a fusion algorithm that may include a Kalman filter, relatively accurate position and orientation measurements can be obtained.

It should be appreciated that the sensors 60, 74 integrated into the scanner 30 may have different characteristics than the sensors 108 of mobile device 43. For example, the resolution of the cameras 60, 160 may be different, or the accelerometers 94, 162 may have different dynamic ranges, frequency response, sensitivity (mV/g) or temperature parameters (sensitivity or range). Similarly, the gyroscopes 96, 164 or compass/magnetometer may have different characteristics. It is anticipated that in some embodiments, one or more sensors 108 in the mobile device 43 may be of higher accuracy than the corresponding sensors 74 in the system 30. As described in more detail herein, in some embodiments the processor 78 determines the characteristics of each of the sensors 108 and compares them with the corresponding sensors in the system 30 when the mobile device. The processor 78 then selects which sensors 74, 108 are used during operation. In some embodiments, the mobile device 43 may have additional sensors (e.g. microphone 116, camera 160) that may be used to enhance operation compared to operation of the system 30 without the mobile device 43. In still further embodiments, the system 30 does not include the IMU 74 and the processor 78 uses the sensors 108 for tracking the position and orientation/pose of the system 30. In still further embodiments, the addition of the mobile device 43 allows the system 30 to utilize the camera 160 to perform three-dimensional (3D) measurements either directly (using an RGB-D camera) or using photogrammetry techniques to generate 3D maps. In an example, the processor 78 uses the communications circuit (e.g. a cellular 4G internet connection) to transmit and receive data from remote computers or devices.

In the exemplary embodiment, the system 30 is a handheld portable device that is sized and weighted to be carried by a single person during operation. Therefore, the plane 136 in which the 2D scanner 50 projects a light beam may not be horizontal relative to the floor or may continuously change as the computer moves during the scanning process. Thus, the signals generated by the accelerometers 94, gyroscopes 96 and compass 98 (or the corresponding sensors 108) may be used to determine the pose (yaw, roll, tilt) of the system 30 and determine the orientation of the plane 51.

In an example, it may be desired to maintain the pose of the system 30 (and thus the plane 136) within predetermined thresholds relative to the yaw, roll and pitch orientations of the system 30. In an example, a haptic feedback device 77 is disposed within the housing 32, such as in the handle 36. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 138 that activates a vibration motor 140. Since the vibration originates in the handle 36, the operator will be notified of the deviation in the orientation of the system 30. The vibration continues until the system 30 is oriented within the predetermined threshold or the operator releases the actuator 38. In an example, it is desired for the plane 136 to be within 10-15 degrees of horizontal (relative to the ground) about the yaw, roll and pitch axes.

Figure 19:
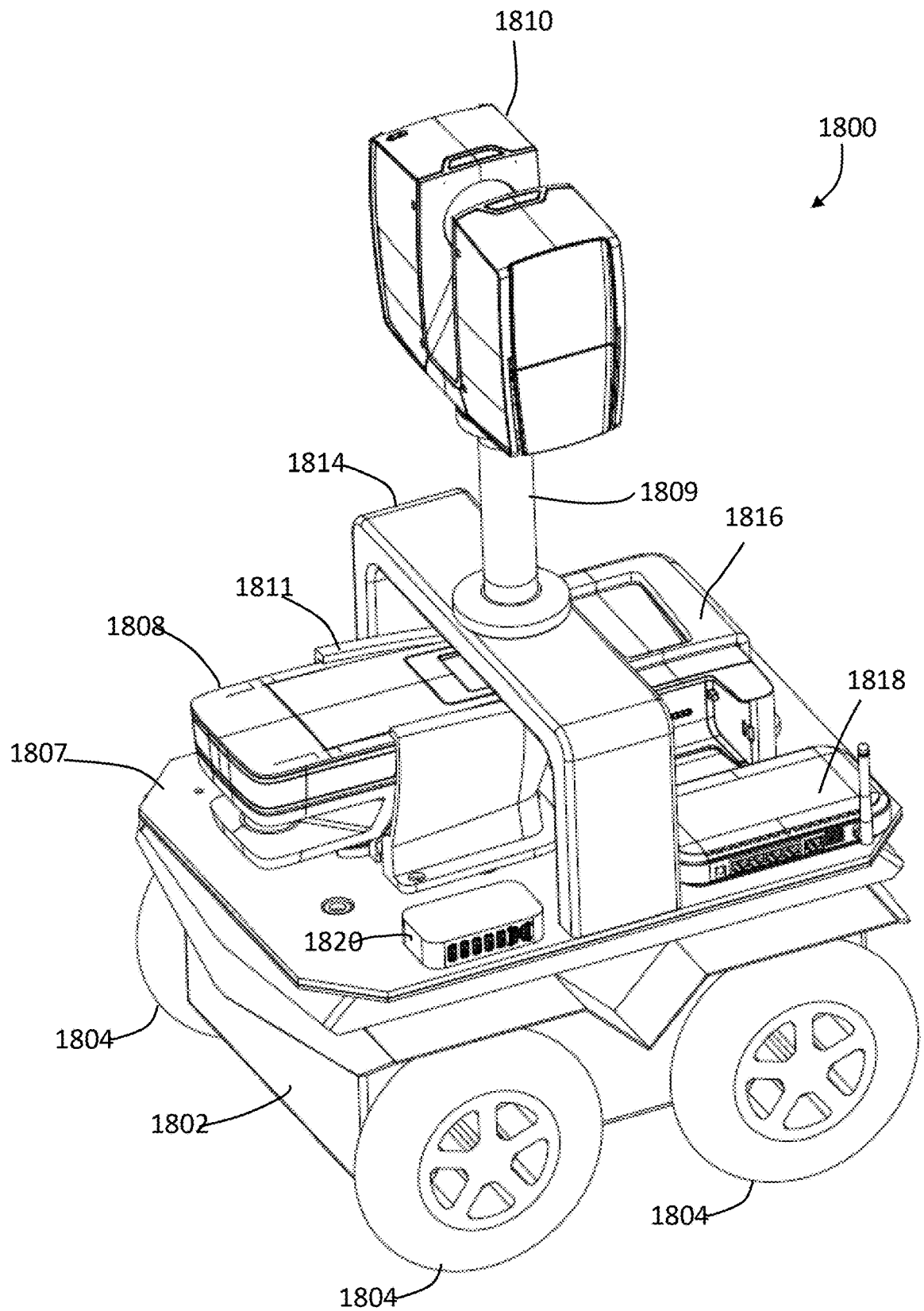
FIG. 19 depicts an example of a scanner according to one or more examples.
Figure 20:
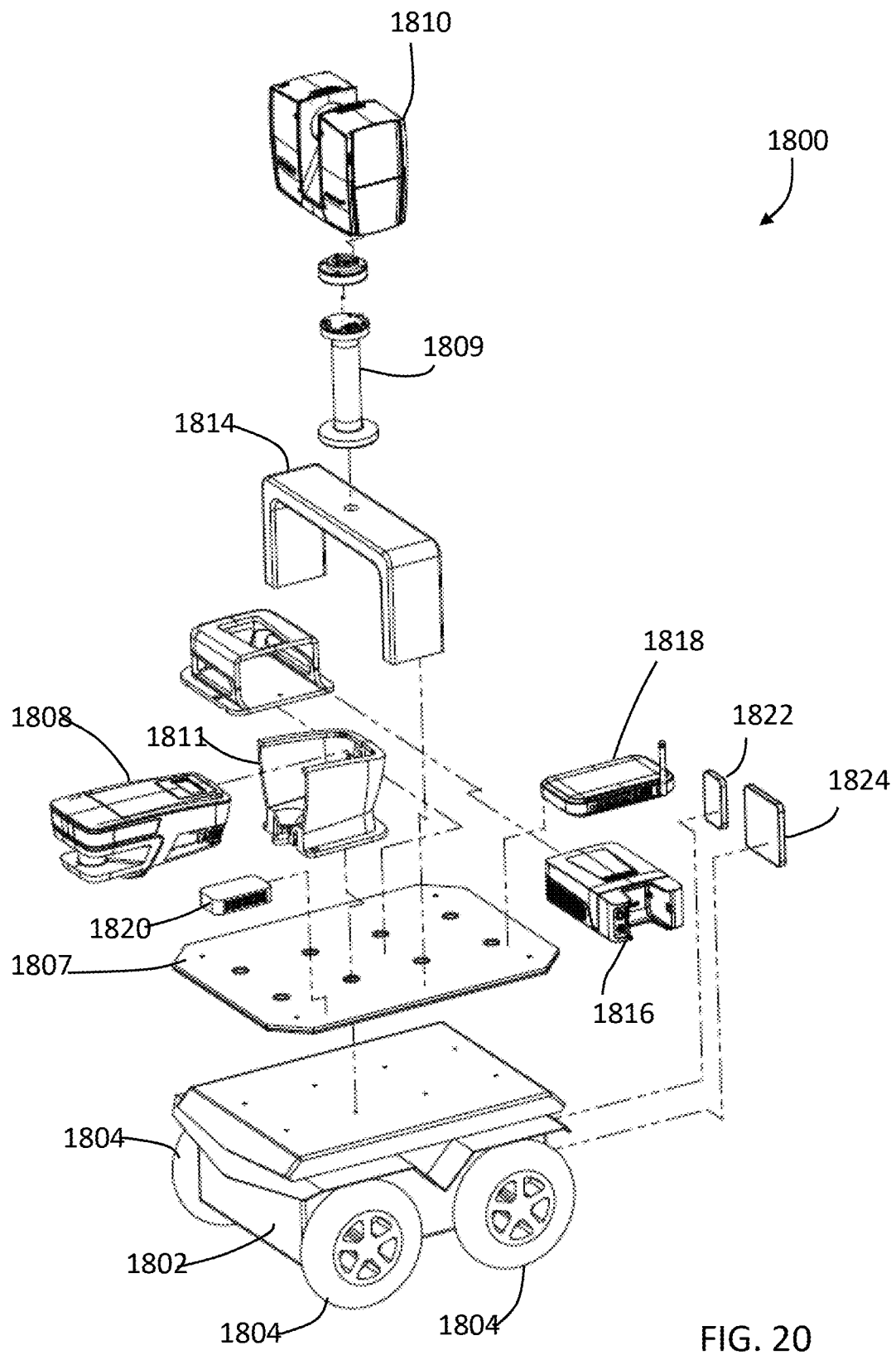
FIG. 20 depicts an example of a scanner according to one or more examples.
Figure 21:
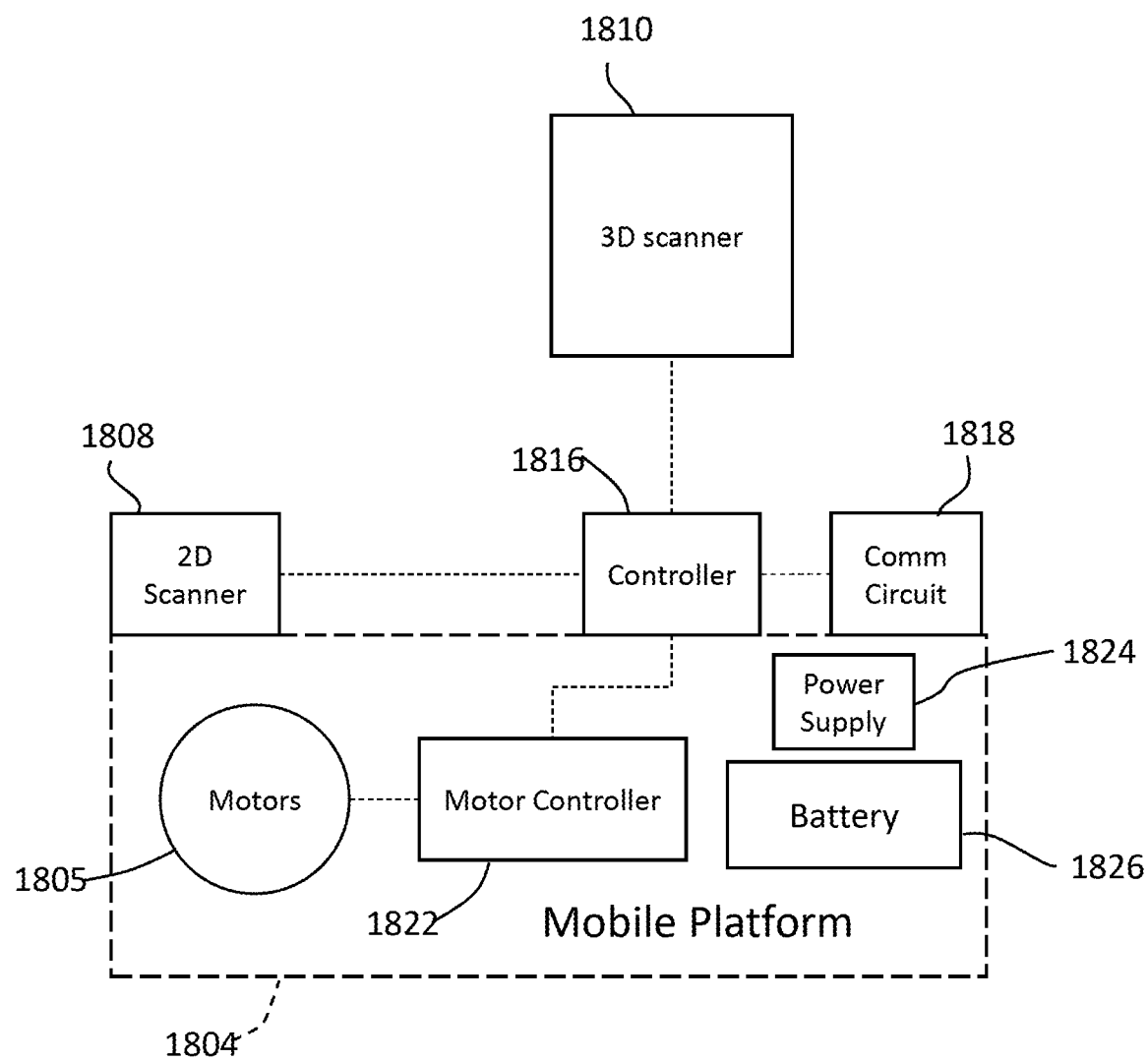
FIG. 21 depicts an example of a scanner according to one or more examples.

Referring now to FIG. 19, FIG. 20, and FIG. 21, an example is shown of a mobile scanning platform 1800. The mobile scanning platform 1800 can be used as the scanner device 120. The mobile scanning platform 1800 includes a base unit 1802 having a plurality of wheels 1804. The wheels 1804 are rotated by motors 1805. In an example, an adapter plate 1807 is coupled to the base unit 1802 to allow components and modules to be coupled to the base unit 1802. The mobile scanning platform 1800 further includes a 2D scanner 1808 and a 3D scanner 1810. In the illustrated embodiment, each scanner 1808, 1810 is removably coupled to the adapter plate 1806. The 2D scanner 1808 may be the scanner illustrated and described herein. As will be described in more detail herein, in some embodiments the 2D scanner 1808 is removable from the adapter plate 1806 and is used to generate a map of the environment, plan a path for the mobile scanning platform to follow, and define 3D scanning locations. In the illustrated embodiment, the 2D scanner 1808 is slidably coupled to a bracket 1811 that couples the 2D scanner 1808 to the adapter plate 1807.

In an example, the 3D scanner 1810 is a time-of-flight (TOF) laser scanner such as that shown and described herein. The scanner 1810 may be that described in commonly owned U.S. Pat. No. 8,705,012, which is incorporated by reference herein. In an example, the 3D scanner 1810 mounted on a pedestal or post 1809 that elevates the 3D scanner 1810 above (e.g. further from the floor than) the other components in the mobile scanning platform 1800 so that the emission and receipt of the light beam is not interfered with. In the illustrated embodiment, the pedestal 1809 is coupled to the adapter plate 1807 by a u-shaped frame 1814.

In an example, the mobile scanning platform 1800 further includes a controller 1816. The controller 1816 is a computing device having one or more processors and memory. The one or more processors are responsive to non-transitory executable computer instructions for performing operational methods such as those described herein. The processors may be microprocessors, field programmable gate arrays (FPGAs), digital signal processors (DSPs), and generally any device capable of performing computing functions. The one or more processors have access to memory for storing information.

Coupled for communication to the controller 1816 is a communications circuit 1818 and an input/output hub 1820. In the illustrated embodiment, the communications circuit 1818 is configured to transmit and receive data via a wireless radio-frequency communications medium, such as WIFI or Bluetooth for example. In an example, the 2D scanner 1808 communicates with the controller 1816 via the communications circuit 1818

In an example, the mobile scanning platform 1800 further includes a motor controller 1822 that is operably coupled to the control the motors 1805. In an example, the motor controller 1822 is mounted to an external surface of the base unit 1802. In another embodiment, the motor controller 1822 is arranged internally within the base unit 1802. The mobile scanning platform 1800 further includes a power supply 1824 that controls the flow of electrical power from a power source, such as batteries 1826 for example. The batteries 1826 may be disposed within the interior of the base unit 1802. In an example, the base unit 1802 includes a port (not shown) for coupling the power supply to an external power source for recharging the batteries 1826. In another embodiment, the batteries 1826 are removable or replaceable.

It should be appreciated that the automated or motorized mobile scanning platform 1800 is illustrated and described for exemplary purposes and the claims should not be so limited. In other embodiments, the mobile scanning platform may be a wheeled mobile assembly that is pushed by an operator. In still further embodiments, the mobile platform may be mounted on the operator, such as a backpack configuration.

It should be appreciated that while embodiments herein describe supporting the registration of landmarks in a 3D point cloud generated by a phase-shift TOF laser scanner, this is, for example, purposes and the claims should not be so limited. In other embodiments, the 3D coordinate data or point cloud may be generated by any type of 3D measurement device, such as but not limited to a pulsed TOF laser scanner, frequency modulated continuous wave (FMCW) scanner, triangulation scanner, an area scanner, a structured light scanner, a laser line probe, a laser tracker, or a combination of the foregoing. Further, it should be appreciated that the examples described herein show top views of scan data; however, side views can also be used for registration, and such registration can also be improved as described herein.

It should be appreciated that while 3D coordinate data may be used for training, the methods described herein for verifying the registration of landmarks may be used with either two-dimensional or three-dimensional data sets.

Technical effects and benefits of the disclosed embodiments include, but are not limited to, increasing scan quality and a visual appearance of scans acquired by the 3D coordinate measurement device.

Figure 22:
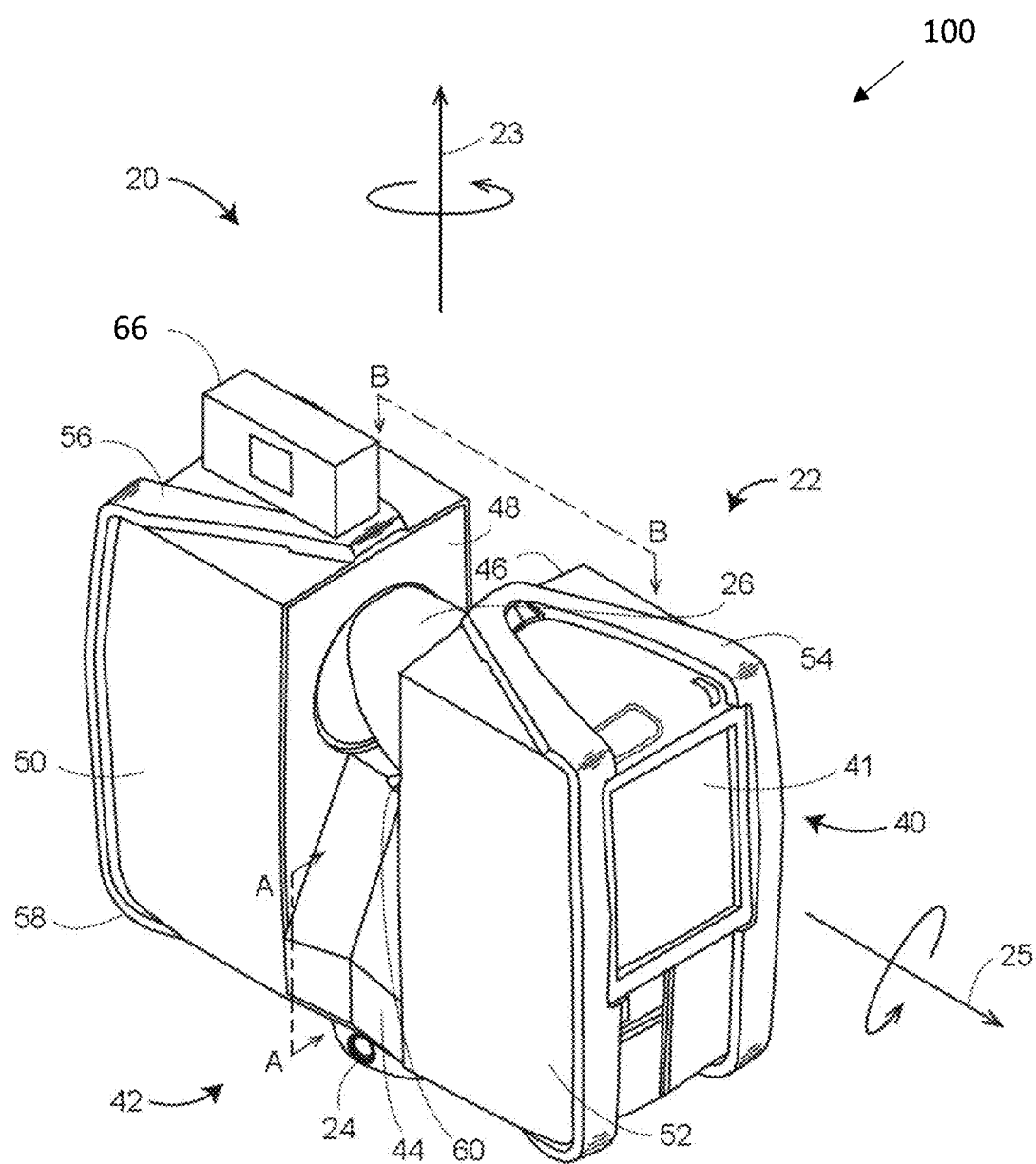
FIG. 22 is a perspective view of a laser scanner in accordance with an embodiment.
Figure 23:
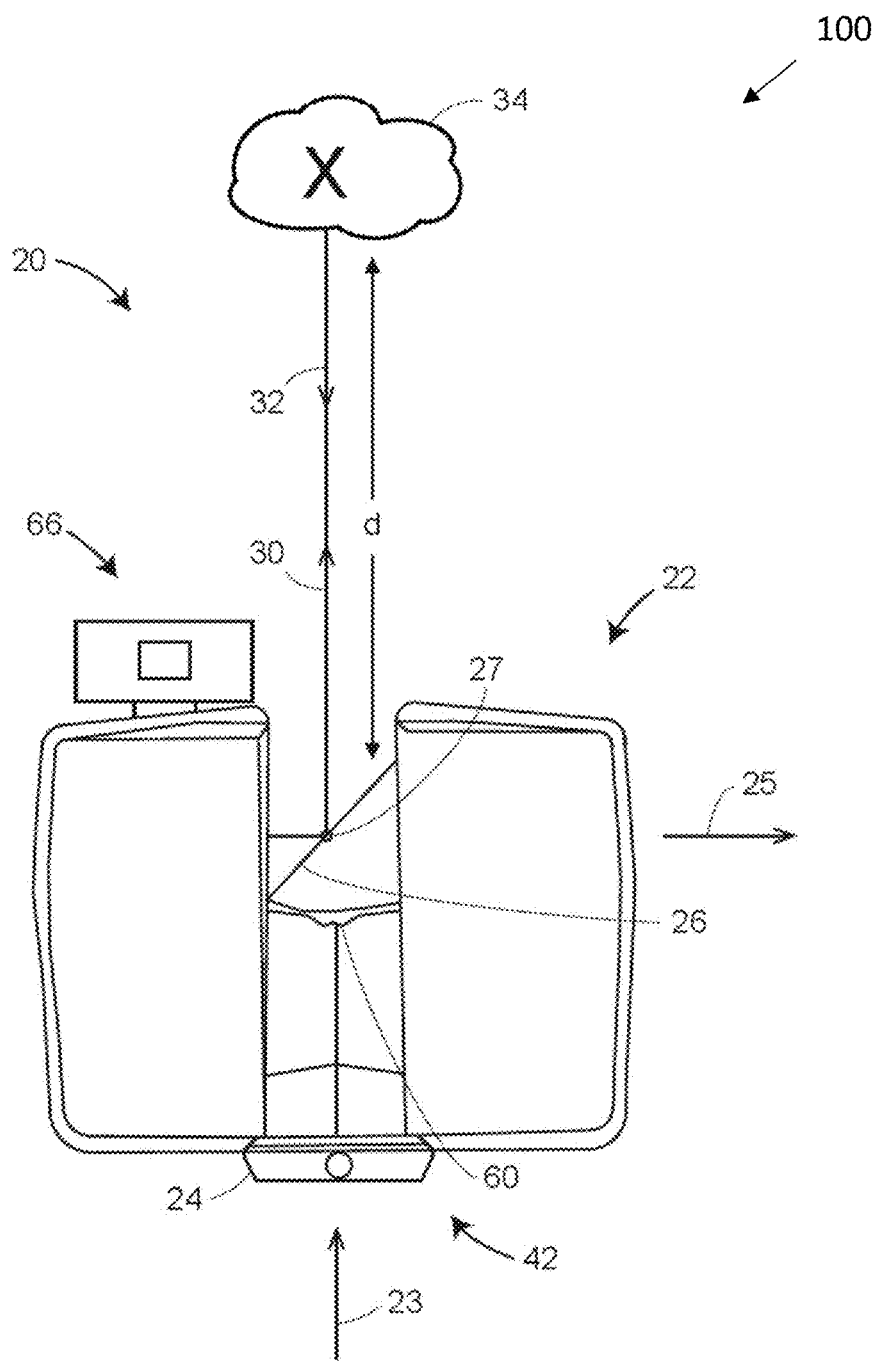
FIG. 23 is a side view of the laser scanner illustrating a method of measurement according to an embodiment.
Figure 24:
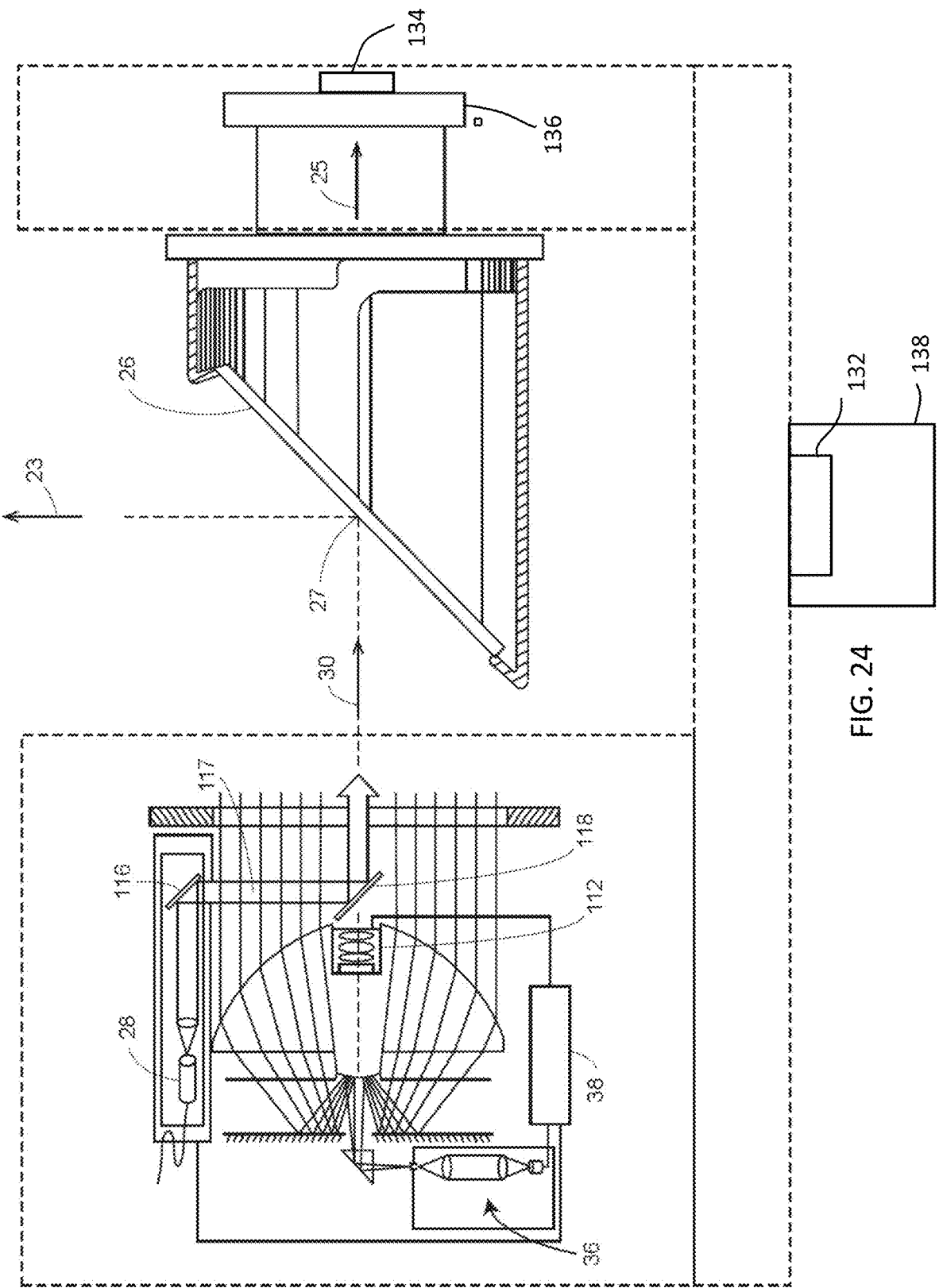
FIG. 24 is a schematic illustration of the optical, mechanical, and electrical components of the laser scanner according to an embodiment.

Referring now to FIGS. 22-24, a laser scanner 20 is shown for optically scanning and measuring the environment surrounding the laser scanner 20. The laser scanner 20 can be used as the scanner device 120. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 23), a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 22, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera with an ultrawide-angle lens, sometimes referred to as a "fisheye camera."

In an embodiment, a camera 112 is located internally to the scanner (see FIG. 24) and may have the same optical axis as the 3D scanner device. In this embodiment, the camera 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The camera 112 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 25:
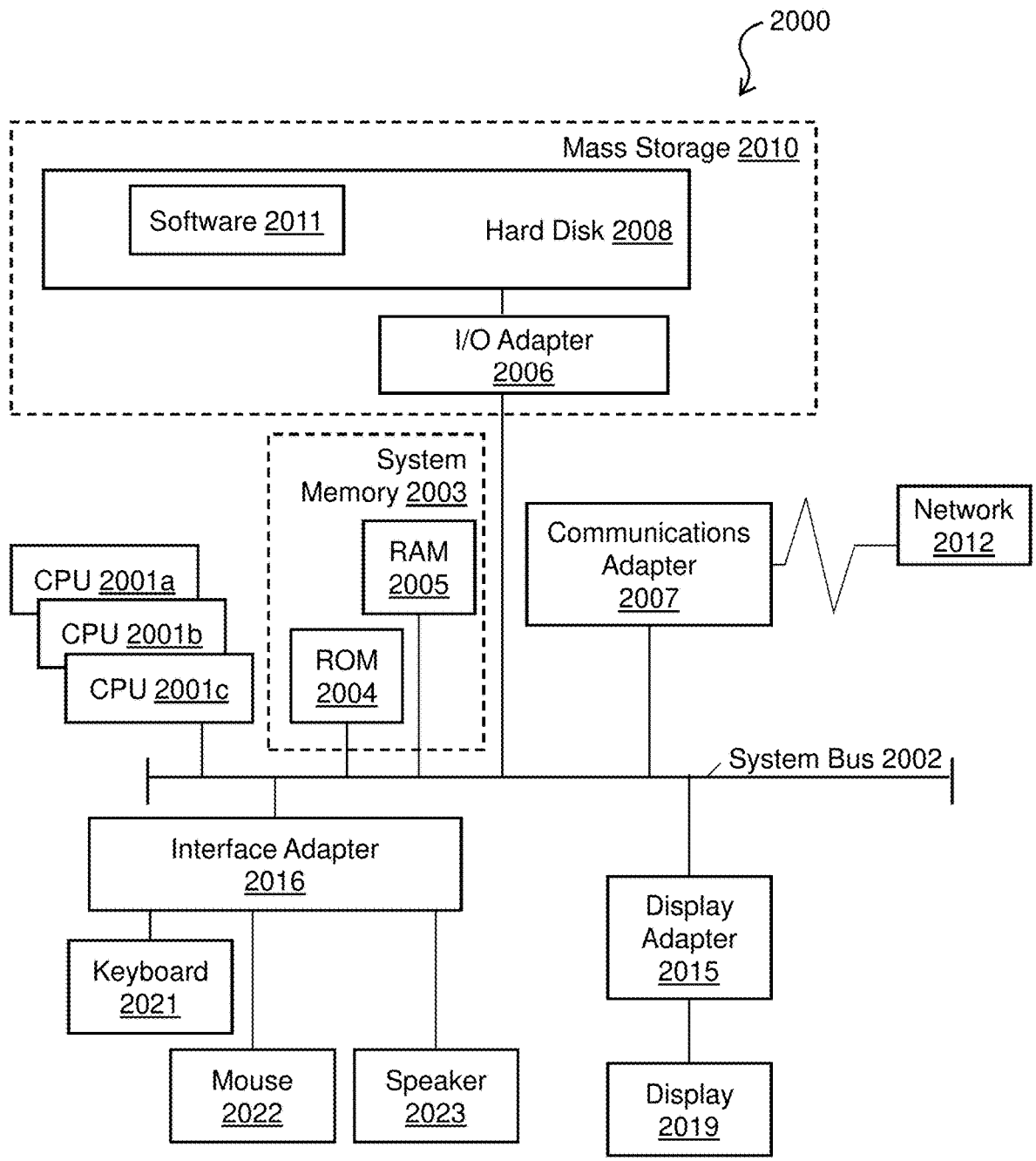
FIG. 25 depicts a computing system that can implement one or more examples.

Turning now to FIG. 25, a computer system 2100 is generally shown in accordance with an example. The computer system 2100 can be an electronic, computer framework comprising and/or employing any number and combination of computing devices and networks utilizing various communication technologies, as described herein. The computer system 2100 can be easily scalable, extensible, and modular, with the ability to change to different services or reconfigure some features independently of others. The computer system 2100 may be, for example, a server, desktop computer, laptop computer, tablet computer, or smartphone. In some examples, computer system 2100 may be a cloud computing node. Computer system 2100 may be described in the general context of computer system executable instructions, such as program modules, being executed by a computer system. Generally, program modules may include routines, programs, objects, components, logic, data structures, and so on that perform particular tasks or implement particular abstract data types. Computer system 2100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 25, the computer system 2100 has one or more central processing units (CPU(s)) 2101a, 2101b, 2101c, etc. (collectively or generically referred to as processor(s) 2101). The processors 2101 can be a single-core processor, multi-core processor, computing cluster, or any number of other configurations. The processors 2101, also referred to as processing circuits, are coupled via a system bus 2102 to a system memory 2103 and various other components. The system memory 2103 can include a read only memory (ROM) 2104 and a random access memory (RAM) 2105. The ROM 2104 is coupled to the system bus 2102 and may include a basic input/output system (BIOS), which controls certain basic functions of the computer system 2100. The RAM is read-write memory coupled to the system bus 2102 for use by the processors 2101. The system memory 2103 provides temporary memory space for operations of said instructions during operation. The system memory 2103 can include random access memory (RAM), read only memory, flash memory, or any other suitable memory systems.

The computer system 2100 comprises an input/output (I/O) adapter 2106 and a communications adapter 2107 coupled to the system bus 2102. The I/O adapter 2106 may be a small computer system interface (SCSI) adapter that communicates with a hard disk 2108 and/or any other similar component. The I/O adapter 2106 and the hard disk 2108 are collectively referred to herein as a mass storage 2110.

Software 2111 for execution on the computer system 2100 may be stored in the mass storage 2110. The mass storage 2110 is an example of a tangible storage medium readable by the processors 2101, where the software 2111 is stored as instructions for execution by the processors 2101 to cause the computer system 2100 to operate, such as is described herein below with respect to the various Figures. Examples of computer program product and the execution of such instruction is discussed herein in more detail. The communications adapter 2107 interconnects the system bus 2102 with a network 2112, which may be an outside network, enabling the computer system 2100 to communicate with other such systems. In one embodiment, a portion of the system memory 2103 and the mass storage 2110 collectively store an operating system, which may be any appropriate operating system, such as the z/OS or AIX operating system from IBM Corporation, to coordinate the functions of the various components shown in FIG. 25.

Additional input/output devices are shown as connected to the system bus 2102 via a display adapter 2115 and an interface adapter 2116 and. In one embodiment, the adapters 2106, 2107, 2115, and 2116 may be connected to one or more I/O buses that are connected to the system bus 2102 via an intermediate bus bridge (not shown). A display 2119 (e.g., a screen or a display monitor) is connected to the system bus 2102 by a display adapter 2115, which may include a graphics controller to improve the performance of graphics intensive applications and a video controller. A keyboard 2121, a mouse 2122, a speaker 2123, etc. can be interconnected to the system bus 2102 via the interface adapter 2116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 25, the computer system 2100 includes processing capability in the form of the processors 2101, and, storage capability including the system memory 2103 and the mass storage 2110, input means such as the keyboard 2121 and the mouse 2122, and output capability including the speaker 2123 and the display 2119.

In some embodiments, the communications adapter 2107 can transmit data using any suitable interface or protocol, such as the internet small computer system interface, among others. The network 2112 may be a cellular network, a radio network, a wide area network (WAN), a local area network (LAN), or the Internet, among others. An external computing device may connect to the computer system 2100 through the network 2112. In some examples, an external computing device may be an external webserver or a cloud computing node.

It is to be understood that the block diagram of FIG. 25 is not intended to indicate that the computer system 2100 is to include all of the components shown in FIG. 25. Rather, the computer system 2100 can include any appropriate fewer or additional components not illustrated in FIG. 25 (e.g., additional memory components, embedded controllers, modules, additional network interfaces, etc.). Further, the embodiments described herein with respect to computer system 2100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It will be appreciated that aspects of the present disclosure may be embodied as a system, method, or computer program product and may take the form of a hardware embodiment, a software embodiment (including firmware, resident software, micro-code, etc.), or a combination thereof. Furthermore, aspects of the present disclosure may take the form of a computer program product embodied in one or more computer-readable medium(s) having computer-readable program code embodied thereon.

One or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer-readable storage medium may be a tangible medium containing or storing a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

The computer-readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present disclosure are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
  a scanner device for capturing stereo images of an environment at a plurality of successive timepoints, the stereo images including a first image captured at a first timepoint and a second image captured at a second timepoint;
  at least one processor in communication with the scanner device, the at least one processor correcting coordinate data for points corresponding to objects in the environment determined by the scanning device by:
    storing a first pose of the scanner device at the first timepoint;
    using a machine learning algorithm to assign first reliability values and first repeatability values to each pixel of a first set of pixels of the first image based on a density around each pixel of the first set of pixels;
    comparing the first reliability values of the first set of pixels to a first threshold;
    comparing the first repeatability values of the first set of pixels to a second threshold;
    using the machine learning algorithm to identify a first set of keypoints and descriptors from the first image, the first set of keypoints comprising those pixels of the first set of pixels having first reliability values that satisfy the first threshold and first repeatability values that satisfy the second threshold;
using the machine learning algorithm to assign second reliability values and second repeatability values to each of a second set of pixels of the second image based on a density around each pixel of the second set of pixels;
comparing second reliability values of the second set of pixels to the first threshold;
comparing second repeatability values of the second set of pixels to the second threshold;
using the machine learning algorithm to identify a second set of keypoints and descriptors from the second image, the second set of keypoints comprising those pixels of the second set of pixels having second reliability values that satisfy the first threshold and second repeatability values that satisfy the second threshold;
identifying a matching keypoint by comparing the first set of keypoints and descriptors with the second set of keypoints and descriptors;
recording the matching keypoint as a natural feature;
determining a second pose of the scanner device at the second timepoint by performing a time-matching of the natural feature at the second timepoint and the natural feature at the first timepoint by:
identifying the natural feature that is present in both the first image and the second image;
computing a rigid transform estimation of the natural feature at the second timepoint and at the first timepoint; and
determining the second pose of the scanner device by updating the first pose from the first timepoint by the rigid transform estimation; and
performing loop closure on an object captured in the environment based on the identification of the natural feature without the use of artificial markers placed in the environment.

2. The system of claim 1, wherein the rigid transform estimation is computed using measured 3D coordinates corresponding to the natural feature that is identified.

3. The system of claim 2, wherein the 3D coordinates are determined by identifying, in a point cloud captured by the scanner device, a point corresponding to the natural feature.

4. The system of claim 1, the identifying of the natural feature that is present at the second timepoint and the first timepoint further comprises:
determining a search window in the stereo image of the second timepoint based on at least one of an output from an inertial measurement unit coupled with the scanner device, and interpolation of an inferred trajectory of the scanner device, wherein the search window comprises the natural feature from the second image.

5. The system of claim 4, wherein the output of the inertial measurement unit is used to estimate poses of the scanner device at timepoints between the second timepoint and the first timepoint.

6. The system of claim 1, wherein the scanner device is handheld.

7. The system of claim 1, further comprising a movable platform connected to the scanner device for transporting the scanner device through the environment.

8. A method for performing a simultaneous location and mapping of a scanner device in an environment, the method comprising:
capturing, by the scanner device, stereo images of the environment at a plurality of successive timepoints, the stereo images including a first image captured at a first timepoint and a second image captured at a second timepoint;
correcting, by one or more processors in communication with the scanner device, coordinate data for points corresponding to objects in the environment determined by the scanning device by:
storing a first pose of the scanner device at the first timepoint;
using a machine learning algorithm to assign first reliability values and first repeatability values to each pixel of a first set of pixels of the first image based on a density around each pixel of the first set of pixels;
comparing the first reliability values of the first set of pixels to a first threshold;
comparing the first repeatability values of the first set of pixels to a second threshold;
using the machine learning algorithm to identify a first set of keypoints and descriptors from the first image, the first set of keypoints comprising those pixels of the first set of pixels having first reliability values that satisfy the first threshold and first repeatability values that satisfy the second threshold;
using the machine learning algorithm to assign second reliability values and second repeatability values to each of a second set of pixels of the second image based on a density around each pixel of the second set of pixels;
comparing second reliability values of the second set of pixels to the first threshold;
comparing second repeatability values of the second set of pixels to the second threshold;
using the machine learning algorithm to identify a second set of keypoints and descriptors from the second image, the second set of keypoints comprising those pixels of the second set of pixels having second reliability values that satisfy the first threshold and second repeatability values that satisfy the second threshold;
identifying a matching keypoint by comparing the first set of keypoints and descriptors with the second set of keypoints and descriptors; and
recording the matching keypoint as a natural feature;
determining a second pose of the scanner device at the second timepoint by performing a time-matching of the natural feature at the second timepoint and the natural feature at the first timepoint by:
identifying the natural feature that is present in both the first image and the second image;
computing a rigid transform estimation of the natural feature at the second timepoint and at the first timepoint; and
determining the second pose of the scanner device by updating the first pose from the first timepoint by the rigid transform estimation; and
performing loop closure on an object captured in the environment based on the identification of the natural feature without the use of artificial markers placed in the environment.

9. The method of claim 8, wherein the rigid transform estimation is computed using measured 3D coordinates corresponding to the natural feature that is identified.

10. The method of claim 9, wherein the 3D coordinates are determined by identifying, in a point cloud captured by the scanner device, a point corresponding to the natural feature.

11. The method of claim 8, the identifying of the natural feature that is present at the second timepoint and the first timepoint further comprises:
    determining a search window in the stereo image of the second timepoint based on at least one of an output from an inertial measurement unit coupled with the scanner device, and interpolation of an inferred trajectory of the scanner device, wherein the search window comprises the natural feature from the second image.

12. The method of claim 8, wherein an output of an inertial measurement unit is used to estimate poses of the scanner device at timepoints between the second timepoint and the first timepoint.

13. The method of claim 8, wherein identifying the matching keypoint further comprises using constraints based on epipolar geometry of a stereo configuration of the scanner device.

14. The method of claim 8, wherein the scanner device is handheld.

15. The method of claim 8, further comprising a movable platform connected to the scanner device for transporting the scanner device through the environment.

16. A computer program product comprising a non-transitory computer-readable medium having program instructions embodied therewith, the program instructions readable by at least one processor to cause the at least one processor to perform a method performing a simultaneous location and mapping of a scanner device in an environment, the method comprising:
    capturing, by a scanner device, stereos image of the environment at a plurality of successive timepoints, the stereo image including a first image captured at a first timepoint and a second image captured at a second timepoint;
    correcting coordinate data for points corresponding to objects in the environment determined by the scanning device by:
        storing a first pose of the scanner device at the first timepoint;
    using a machine learning algorithm to assign first reliability values and first repeatability values to each pixel of a first set of pixels of the first image based on a density around each pixel of the first set of pixels;
    comparing the first reliability values of the first set of pixels to a first threshold;
    comparing the first repeatability values of the first set of pixels to a second threshold;
        using the machine learning algorithm to identify a first set of keypoints and descriptors from the first image, the first set of keypoints comprising those pixels of the first set of pixels having first reliability values that satisfy the first threshold and first repeatability values that satisfy the second threshold;
    using the machine learning algorithm to assign second reliability values and second repeatability values to each of a second set of pixels of the second image based on a density around each pixel of the second set of pixels;
    comparing second reliability values of the second set of pixels to the first threshold;
    comparing second repeatability values of the second set of pixels to the second threshold;
    using the machine learning algorithm to identify a second set of keypoints and descriptors from the second image, the second set of keypoints comprising those pixels of the second set of pixels having second reliability values that satisfy the first threshold and second repeatability values that satisfy the second threshold;
        identifying a matching keypoint by comparing the first set of keypoints and descriptors with the second set of keypoints and descriptors; and
        recording the matching keypoint as a natural feature; and
        determining a second pose of the scanner device at the second timepoint by performing a time-matching of the natural feature at the second timepoint and the natural feature at the first timepoint by:
        identifying the natural feature that is present in both the first image and the second image;
        computing a rigid transform estimation of the natural feature at the second timepoint and at the first timepoint; and
        determining the second pose of the scanner device by updating the first pose from the first timepoint by the rigid transform estimation; and
    performing loop closure on an object captured in the environment based on the identification of the natural feature without the use of artificial markers placed in the environment.

17. The computer program product of claim 16, wherein the rigid transform estimation is computed using measured 3D coordinates corresponding to the natural feature that is identified.

18. The computer program product of claim 17, wherein the 3D coordinates are determined by identifying, in a point cloud captured by the scanner device, a point corresponding to the natural feature.

19. The computer program product of claim 16, the identifying of the natural feature that is present at the second timepoint and the first timepoint comprises:
    determining a search window in the stereo image of the second timepoint based on at least one of an output from an inertial measurement unit coupled with the scanner device, and interpolation of an inferred trajectory of the scanner device, wherein the search window comprises the natural feature from the second image.

20. The computer program product of claim 16, wherein an output of an inertial measurement unit is used to estimate poses of the scanner device at timepoints between the second timepoint and the first timepoint.

* * * * *